(12) United States Patent
Watanabe et al.

(10) Patent No.: US 6,823,083 B1
(45) Date of Patent: Nov. 23, 2004

(54) SATURATION CORRECTING APPARATUS AND METHOD

(75) Inventors: Koichi Watanabe, Asaka (JP); Yoshihiro Yamaguchi, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 790 days.

(21) Appl. No.: 09/718,408

(22) Filed: Nov. 24, 2000

(30) Foreign Application Priority Data

Nov. 25, 1999 (JP) ............................................ 11-334036
Aug. 28, 2000 (JP) ........................................ 2000-256577

(51) Int. Cl.$^7$ ................................................ G06K 9/00
(52) U.S. Cl. ....................................... 382/167; 358/520
(58) Field of Search ................................ 382/162, 167; 358/518, 520

(56) References Cited

U.S. PATENT DOCUMENTS 5,696,839 A * 12/1997 Siegeritz ...................... 382/162
6,002,806 A * 12/1999 Morikawa .................... 358/520

* cited by examiner

Primary Examiner—Phuoc Tran
(74) Attorney, Agent, or Firm—Birch, Stewart, Kolasch & Birch, LLP

(57) ABSTRACT

In order to emphasize saturation without causing color compression, a saturation correction curve is determined such that color difference data relating to one pixel is not corrected when it represents maximum saturation or minimum saturation which saturation data relating to the one pixel can take, while being corrected when it represents intermediate saturation between the maximum saturation and the minimum saturation. Even if the saturation of color difference data Cb and Cr is corrected, it is possible to prevent color compression from occurring by the saturation of the color difference data Cb and Cr whose saturation has been corrected.

23 Claims, 25 Drawing Sheets

*Fig. 5*  COLOR REPRODUCTION REGION ON Cb-Cr COLOR DIFFERENCE PLANE IN LUMINANCE Y=56

*Fig. 7*
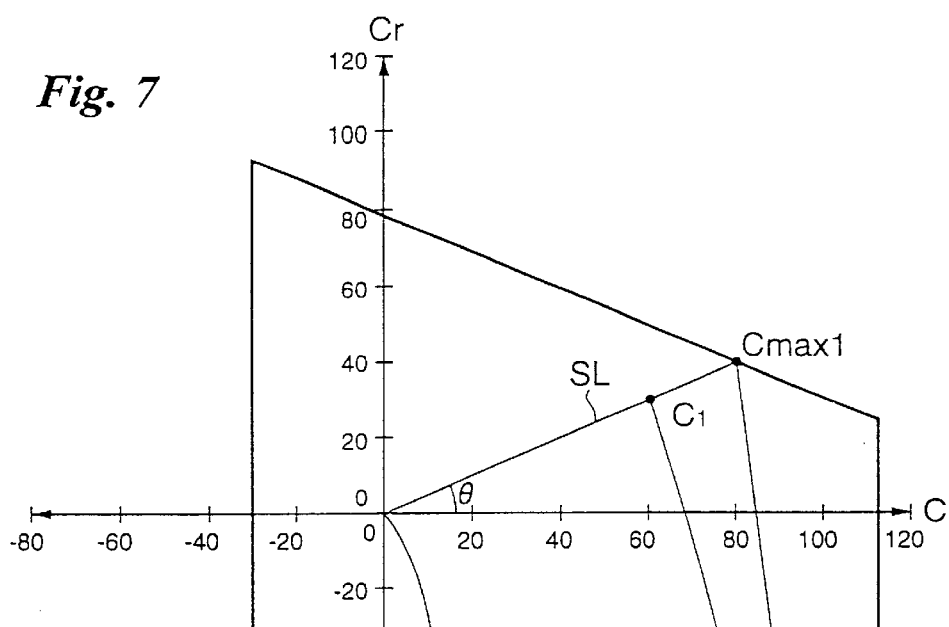
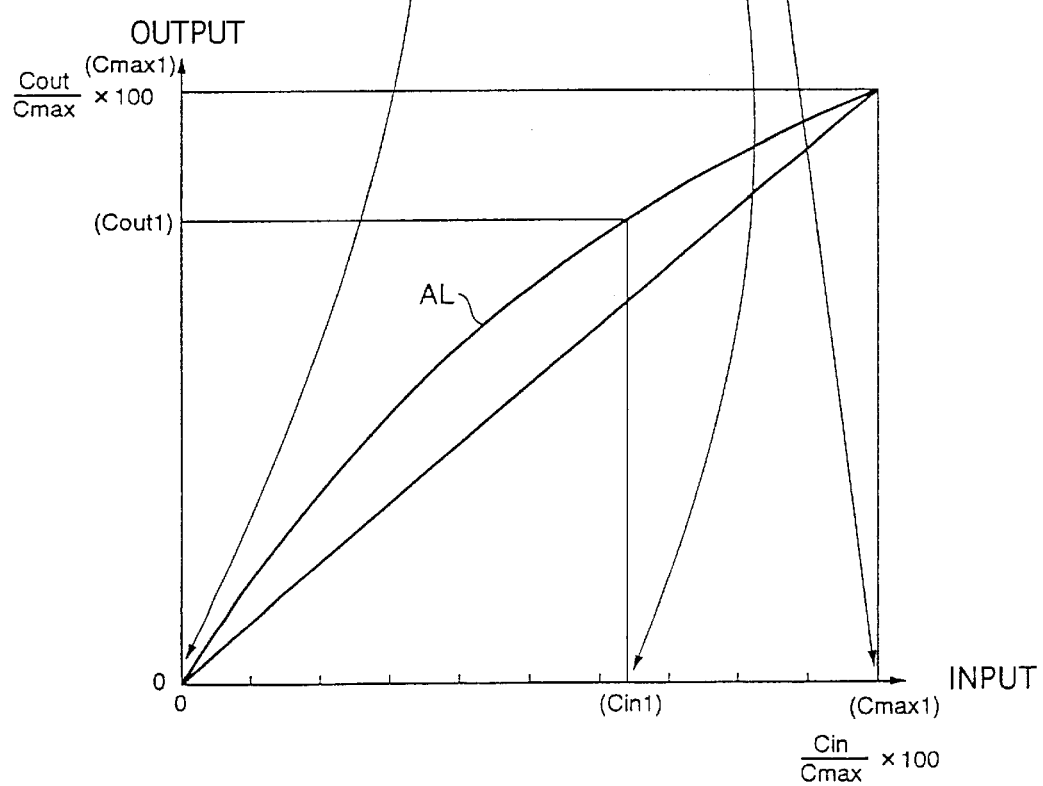

COLOR REPRODUCTION REGION ON Cb-Cr COLOR DIFFERENCE PLANE IN LUMINANCE Y=56

SATURATION CORRECTING APPARATUS AND METHOD

BACKGROUND OF THE INVENTION

1. Field of the Invention

The present invention relates to an apparatus for and a method of correcting data representing saturation (color saturation, chromaticness, colorfulness or chroma), an apparatus for and a method of calculating maximum saturation, and an apparatus for and a method of correcting pixel data, and a method of determining a saturation correction curve.

2. Description of the Background Art

A color image read using a color scanner or the like may, in some cases, be insufficient in (color) saturation. In such a color image, correction processing for emphasizing saturation may, in some cases, be performed. In a coordinate system (an L*a*b* coordinate system, an L*u*v* coordinate system, etc.) in a uniform perception color space (uniform perceptual space) which can be handled independently by lightness (luminance), saturation and hue, the saturation is multiplexed by a fixed coefficient (constant value), to perform correction for emphasizing the saturation.

However, saturation which can be expressed is limited. When the (color) saturation (colorfulness) is multiplexed by a uniform fixed coefficient to perform correction for emphasizing the (color) saturation (colorfulness), therefore, data representing the (color) saturation (colorfulness) after the corrected may, in some cases, be saturated. Color compression occurs by the saturation.

SUMMARY OF THE INVENTION

An object of the present invention is to emphasize saturation without causing color compression.

Another object of the present invention is to calculate maximum saturation which can be taken by one pixel.

Still another object of the present invention is to make it possible to change maximum saturation.

A saturation correcting apparatus according to a first aspect of the present invention is characterized by comprising saturation data input means for inputting saturation data relating to an image corresponding to one frame which should be corrected; and correction means for performing, with respect to the saturation data relating to the image corresponding to one frame which has been inputted from the saturation data input means, saturation correction processing based on a correction curve for emphasizing and outputting, when the saturation data relating to one of pixels composing the image corresponding to one frame represents intermediate saturation between maximum saturation and minimum saturation which the saturation data relating to the one pixel can take, the saturation data, while outputting, when the saturation data represents the maximum saturation, the saturation data upon stopping the emphasis processing.

The first aspect of the present invention also provides a method suitable for the above-mentioned apparatus. That is, the method comprises the steps of inputting saturation data relating to an image corresponding to one frame which should be corrected; and performing, with respect to the inputted saturation data relating to the image corresponding to one frame, saturation correction processing based on a correction curve for emphasizing and outputting, when the saturation data relating to one of pixels composing the image corresponding to one frame represents intermediate saturation between maximum saturation and minimum saturation which the saturation data relating to the one pixel can take, the saturation data, while outputting, when the saturation data represents the maximum saturation, the saturation data upon stopping the emphasis processing.

According to the first aspect of the present invention, the saturation data relating to the image corresponding to one frame which should be corrected is inputted. Such correction that the saturation data relating to one of the pixels composing the image corresponding to one frame is emphasized and outputted when it represents the intermediate saturation between the maximum saturation and the minimum saturation which the saturation data relating to the one pixel can take, while being outputted upon stopping the emphasis processing when it represents the maximum saturation is made with respect to the saturation data relating to the image corresponding to one frame.

According to the first aspect of the present invention, when the saturation data relating to the one pixel represents the maximum saturation which the saturation data relating to the one pixel can take, no correction for emphasizing saturation is made. Accordingly, it is possible to prevent the saturation data from being saturated by correction for emphasizing saturation. Consequently, it is possible to prevent color compression from occurring by the saturation emphasis processing. When the saturation data relating to the one pixel represents the intermediate saturation, correction for emphasizing saturation is made. A sharp image is thus obtained.

When the saturation data relating to one of the pixels composing the image corresponding to one frame represents the maximum saturation or the minimum saturation, it may be outputted as it is. When the saturation data represents the maximum saturation, processing for decreasing the saturation may be performed.

The saturation correcting apparatus may further comprise a correction curve producing device for producing the correction curve. The correction curve may be produced in the form of a table and previously stored.

The correction curve may be determined such that the saturation represented by the saturation data after the saturation correction processing is less than the maximum saturation. In the intermediate saturation, it is possible to prevent the saturation data after the correction from being saturated even if the correction for emphasizing saturation is made.

The correction curve can be realized by a circular arc or a polygonal line, for example.

The correction curve can be specifically determined on the basis of the maximum saturation calculated on the basis of luminance data and hue angle data which correspond to the saturation data.

An average of the saturation data relating to the image corresponding to one frame is calculated, to determine the correction curve such that the lower the calculated average is, the higher the degree of correction is, while the higher the calculated average is, the lower the degree of correction is.

The saturation correcting apparatus may further comprise correction value calculation means for calculating a color difference correction value from the characteristics of color difference data relating to the image corresponding to one frame which should be corrected; and subtraction means for subtracting the color difference correction value from the color difference data relating to the image corresponding to one frame which should be corrected. In this case, the correction means will perform the saturation correction processing on the basis of the correction curve with respect to the saturation data corresponding to the color difference data from which the color difference correction value has been subtracted by the subtraction means.

A color based on an imaging light source at the time of imaging may, in some cases, be further overlapped with a subject image (so-called color fogging). In a case where the saturation is emphasized when the color fogging occurs, the color fogging may, in some cases, be further emphasized.

A predetermined color difference correction value is subtracted from the color difference data relating to the image corresponding to one frame which should be corrected. Accordingly, it is possible to prevent the color fogging from being emphasized even if the saturation is corrected.

The saturation correcting apparatus may further comprises range calculation means for respectively finding a first range in which the values of the three primary colors are not more than their maximum values in first luminance of less than the maximum luminance and a second range in which the values of the three primary colors are not less than their minimum values in second luminance of more than the minimum luminance; first saturation calculation means for finding first maximum saturation defined by the first range of the values of the three primary colors and in the hue of the one pixel whose maximum saturation should be found and second maximum saturation defined by the second range of the values of the three primary colors and in the hue of the one pixel whose maximum saturation should be found; second saturation calculation means for calculating saturation in the luminance of the one pixel whose maximum saturation should be found, that is, first corresponding saturation corresponding to the first maximum saturation and second corresponding saturation corresponding to the second maximum saturation; and saturation determination means for determining the saturation having the smaller value out of the first corresponding saturation and the second corresponding saturation which have been calculated by the second saturation calculation means to be the maximum saturation. Consequently, the maximum saturation can be calculated. The first luminance and the second luminance may be the same or different from each other.

The maximum saturation calculating apparatus can be also individually constructed. The present invention also provides a method of calculating maximum saturation. That is, in an apparatus for finding maximum saturation which pixel data representing each of pixels can take, the method comprises the steps of respectively finding a first range in which the values of the three primary colors are not more than their maximum values in first luminance of less than maximum luminance and a second range in which the values of the three primary colors are not less than their minimum values in second luminance of more than minimum luminance; finding first maximum saturation defined by the first range of the values of the three primary colors and in the hue of the one pixel whose maximum saturation should be found and second maximum saturation defined by the second range of the values of the three primary colors and in the hue of the one pixel whose maximum saturation should be found; calculating saturation in the luminance of the one pixel whose maximum saturation should be found, that is, first corresponding saturation corresponding to the first maximum saturation and second corresponding saturation corresponding to the second maximum saturation; and determining the saturation having the smaller value out of the found first corresponding saturation and second corresponding saturation to be the maximum saturation taken by the pixel data.

The first saturation and the second saturation may be previously stored (in storage means), to calculate the maximum saturation using the stored first saturation and second saturation.

The first luminance and the second luminance may be determined such that luminance obtained by the weighted mean of the first luminance and the second luminance is intermediate luminance between the minimum luminance and the maximum luminance. In this case, one of the first range of the values of the three primary colors and the second range of the values of the three primary colors is found on the basis of the other range.

A pixel data correcting apparatus according to a second aspect of the present invention is characterized by comprising luminance calculation means for calculating luminance in which maximum saturation is given in the hue of a pixel to be corrected whose saturation should be corrected; and luminance correction means for correcting, when there is a difference between the luminance calculated by the luminance calculation means and the luminance of the pixel to be corrected, the luminance of the pixel to be corrected such that the difference is decreased.

The second aspect of the present invention also provides a method suitable for the above-mentioned apparatus. That is, the method comprises the steps of calculating luminance in which maximum saturation is given in the hue of a pixel to be corrected whose saturation should be corrected; and correcting, when there is a difference between the calculated luminance and the luminance of the pixel to be corrected, the luminance of the pixel to be corrected such that the difference is decreased.

As described above, the maximum saturation which a certain pixel can take is limited. However, the maximum saturation which the pixel can take can be further increased by changing the luminance of the pixel.

According to the second aspect of the present invention, the luminance in which the maximum saturation is given in the hue of the pixel to be corrected is calculated. When there is a difference between the calculated luminance and the luminance of the pixel to be corrected, the maximum saturation can be further increased by changing the luminance. When there is a difference between the calculated luminance and the luminance of the pixel to be corrected, therefore, the luminance of the pixel to be corrected is corrected such that the difference is decreased. Even if the luminance is changed, the saturation can be further increased.

The saturation of the pixel to be corrected whose luminance has been corrected is thus corrected. A sharper pixel can be thus obtained.

The pixel data correcting apparatus may further comprise determination means for determining the amount of correction of the luminance by the luminance correction means on the basis of the hue, the saturation of the pixel to be corrected or the ratio of the saturation to the maximum saturation.

The correction amount of the luminance may be limited to not more than a predetermined amount. An image whose lightness hardly differs from the lightness of the image actually obtained is obtained. The correction amount of the luminance may be limited depending on the hue, the saturation, or so forth.

A pixel data correcting apparatus according to a third aspect of the present invention is characterized by comprising judgment means for judging whether or not maximum saturation in the hue of a pixel to be corrected whose saturation should be corrected can be further increased by changing the hue; and hue change means for changing the hue of the pixel to be corrected such that the maximum saturation is increased in response to the judgment by the judgment means that the maximum saturation can be further increased by changing the hue.

The third aspect of the present invention also provides a method suitable for the above-mentioned apparatus. That is, the method comprises the steps of judging whether or not maximum saturation in the hue of a pixel to be corrected whose saturation should be corrected can be further increased by changing the hue; and changing the hue of the pixel to be corrected such that the maximum saturation is increased in response to the judgment that the maximum saturation can be further increased by changing the hue.

According to the third aspect of the present invention, it is judged whether or not the maximum saturation can be further increased by changing the hue. When the maximum saturation can be further increased, the hue of the pixel to be corrected is changed to be further increased. Even if the hue is changed, the saturation can be further increased. This is suitable for a case where it is desired to emphasize sharpness rather than the hue. The saturation of the pixel to be corrected whose hue has been corrected is thus corrected. A sharper pixel can be thus obtained.

Also in this case, the hue may be changeable in a predetermined range.

A pixel data correcting apparatus according to a fourth aspect of the present invention is characterized by comprising input means for inputting data representing the hue of a pixel to be corrected whose saturation should be corrected; and hue change means for bringing the hue represented by the hue data inputted from the input means near the hue at the shorter distance from the hue of the pixel out of the hues of the primary colors with the hue of the pixel interposed therebetween.

The fourth aspect of the present invention also provides a method suitable for the above-mentioned apparatus. That is, the hue of a pixel to be corrected whose saturation should be corrected is brought near the hue at the shorter distance from the hue of the pixel out of the hues of the primary colors with the hue of the pixel interposed therebetween.

Such correction also makes it possible to obtain a sharp pixel.

A fifth aspect of the present invention is directed to a saturation correcting apparatus for correcting the saturation of each of pixels on the basis of a correction curve having correction characteristics for emphasizing and outputting inputted saturation, characterized by comprising calculation means for calculating the shortest one of the distances on a color space between the color of the pixel whose saturation should be corrected and the three primary colors; and means for determining the correction curve such that the maximum saturation which can be inputted is further emphasized and outputted, and the larger the distance calculated by the calculation means is, the higher the degree of the emphasis is, while the smaller the distance is, the lower the degree of the emphasis is.

The fifth aspect of the present invention also provides a correction curve determining method suitable for the above-mentioned apparatus. That is, in an apparatus for correcting the saturation of each of pixels on the basis of a correction curve having correction characteristics for emphasizing and outputting inputted saturation, the method comprises the steps of calculating the shortest one of the distances on a color space between the color of the pixel whose saturation should be corrected and the three primary colors; and determining the correction curve such that the maximum saturation which can be inputted is further emphasized and outputted, and the larger the calculated distance is, the higher the degree of the emphasis is, while the smaller the distance is, the lower the degree of the emphasis is.

According to the fifth aspect of the present invention, the respective distances on the color space between the color of the pixel whose saturation should be corrected and the three primary colors are calculated. The correction curve is determined such that the farther the color of the pixel whose saturation should be corrected is away from the primary colors (the larger the distance is), the lower the degree of the emphasis is, while the nearer the color of the pixel whose saturation should be corrected is to the primary colors (the larger the distance is), the higher the degree of the emphasis is. The saturation is corrected on the basis of the determined correction curve.

When the color of the pixel whose saturation should be corrected is near to the primary colors, the possibility that so-called color compression occurs is increased if the saturation is emphasized in excess of 100%. According to the fifth aspect of the present invention, when the color of the pixel whose saturation should be corrected is near to the primary colors, the degree of the emphasis is decreased, thereby reducing the possibility that color compression occurs. When the color of the pixel whose saturation should be corrected is farther away from the primary colors, the degree of the emphasis is increased to exceed 100%. Accordingly, it is possible to obtain a sharp pixel whose saturation has been further emphasized.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a graph showing a color reproduction region in predetermined luminance and a saturation correction curve;

DESCRIPTION OF THE PREFERRED EMBODIMENTS

FIGS. 1 to 4 illustrate a color space defined by luminance Y and color differences Cb(B-Y) and Cr(R-Y). In the present embodiment, the distance from the origin (the luminance Y axis) on a color difference plane (a Cb-Cr plane) is taken as (color saturation, chromaticness, colorfulness or chroma) saturation. In the L*a*b* coordinate system, the distance from the origin (L*) on an a*b* plane is saturation.

There is a relationship expressed by the following equations 1 to 3 between the luminance Y and the color differences Cb and Cr, and RGB (Red, Green, and Blue) in an RGB color space:

$$Y = 0.2990R + 0.5870G + 0.1140B \quad \text{equation 1}$$

$$Cb = -0.1687R - 0.3313G + 0.5000B \quad \text{equation 2}$$

$$Cr = 0.5000R - 0.4187G + 0.813B \quad \text{equation 3}$$

The equations 1 to 3 can be rewritten as the following equations 4 to 6:

$$R = Y + 1.40200Cr \quad \text{equation 4}$$

$$G = Y - 0.34414Cb - 0.71414Cr \quad \text{equation 5}$$

$$B = Y + 1.77200Cb \quad \text{equation 6}$$

When each of data respectively representing R, G, and B (hereinafter referred to as RGB data) is expressed by eight bits, a value which each of the RGB data can take is in the range of 0 to 255 in decimal notation. In a case where each of the RGB data can take a value in the range of 0 to 255 in decimal notation, when the RGB data is converted into luminance Y and color differences Cb and Cr, values which the luminance Y and the color differences Cb and Cr can take are also limited.

In FIGS. 1 to 4, when each of the RGB data is represented by 0 to 255, Y, Cb and Cr exist within the range of a solid S, while not existing outside the range of the solid S.

Figure 1:
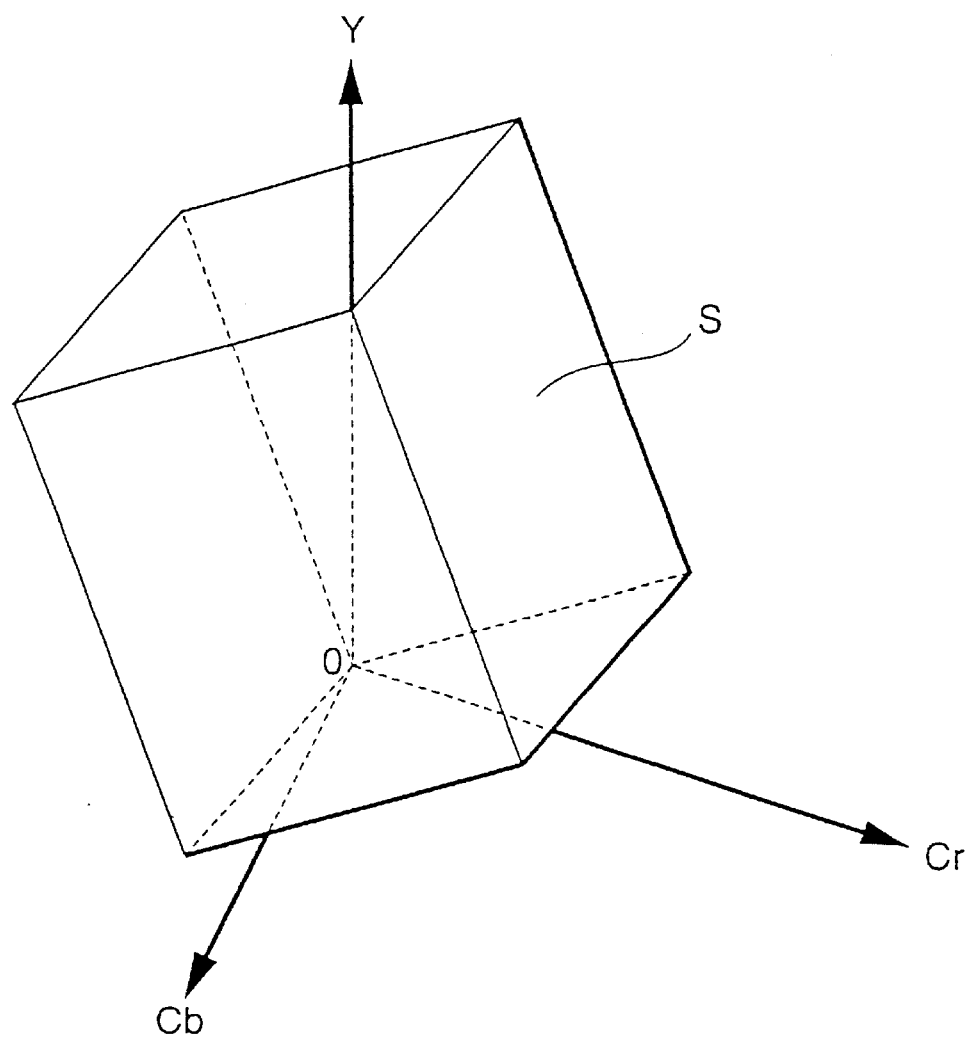
FIGS. 1 to 4 illustrate a YCbCr color space.
Figure 2:
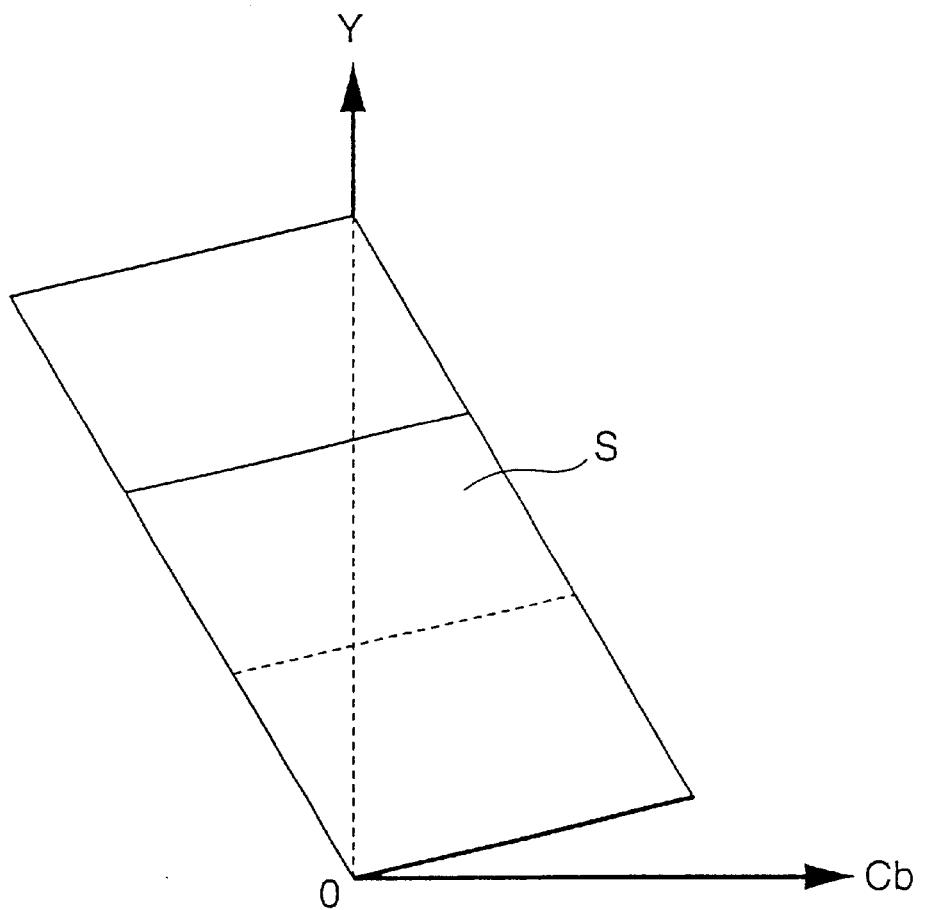
Figure 3:
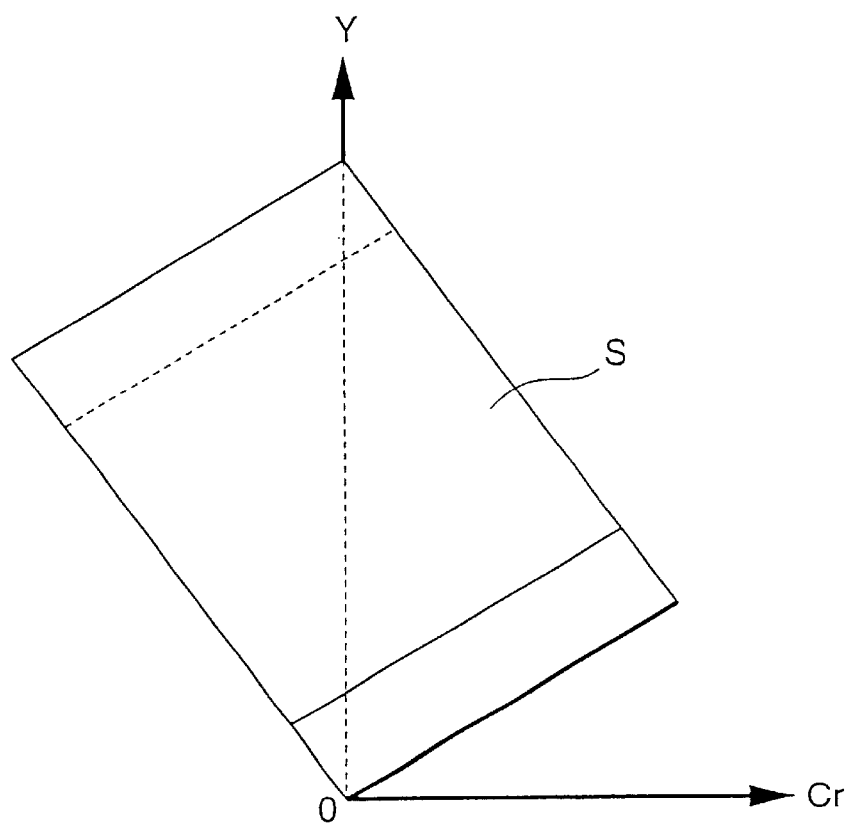
Figure 4:
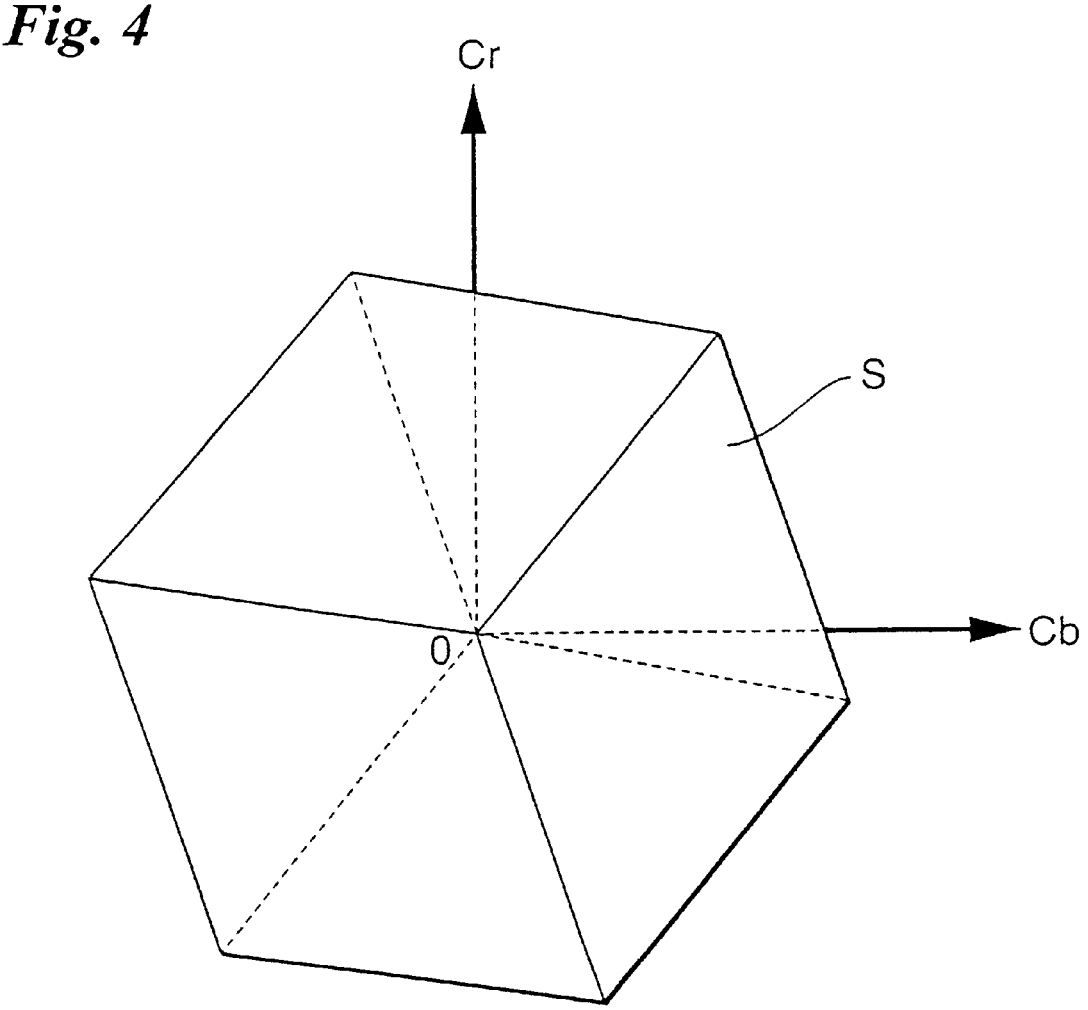
Figure 5:
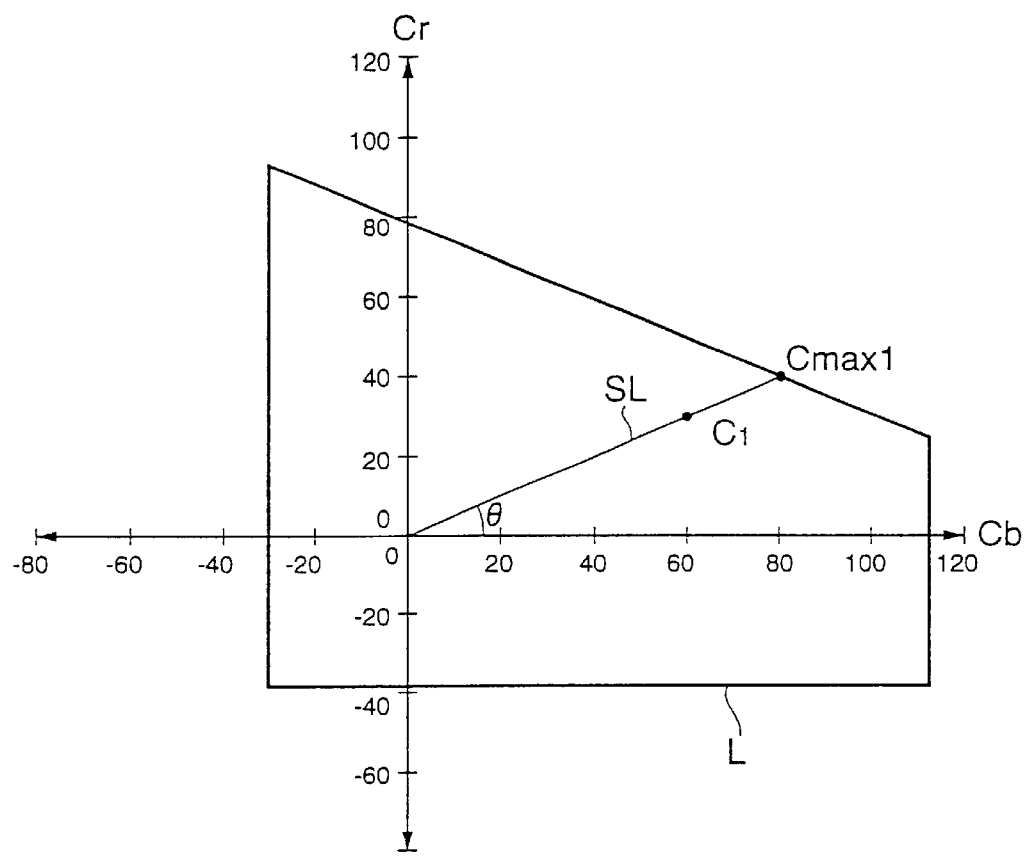
FIG. 5 is a graph showing a color reproduction region in predetermined luminance.

FIG. 5 illustrates a color reproduction region on a Cb-Cr color difference plane in luminance Y=56 in the solid S shown in FIGS. 1 to 4.

In the luminance Y=56, the values of the color differences Cb and Cr at which each of the corresponding RGB data exists are within a region enclosed by a solid line L (referred to as a color reproduction region).

Consider a pixel with luminance Y=56, a color difference Cb=60, and a color difference Cr=80, for example. When the values of the luminance Y and the color differences Cb and Cr are substituted in the equations 4 to 6, R=168.16, G=−21.78, and B=162.32. The value of G is negative (which does not exist in the range of 0 to 255 in decimal notation). Accordingly, a coordinate point defined by the color difference Cb=60 and the color difference Cr=80 does not exist within the color reproduction region in the luminance Y=56.

In the present embodiment, the color difference (saturation) existing within the color reproduction region is emphasized in consideration of the color reproduction region. The color differences Cb and Cr at the limit of the color reproduction region enclosed by the solid line L are the maximum saturation.

Figure 6:
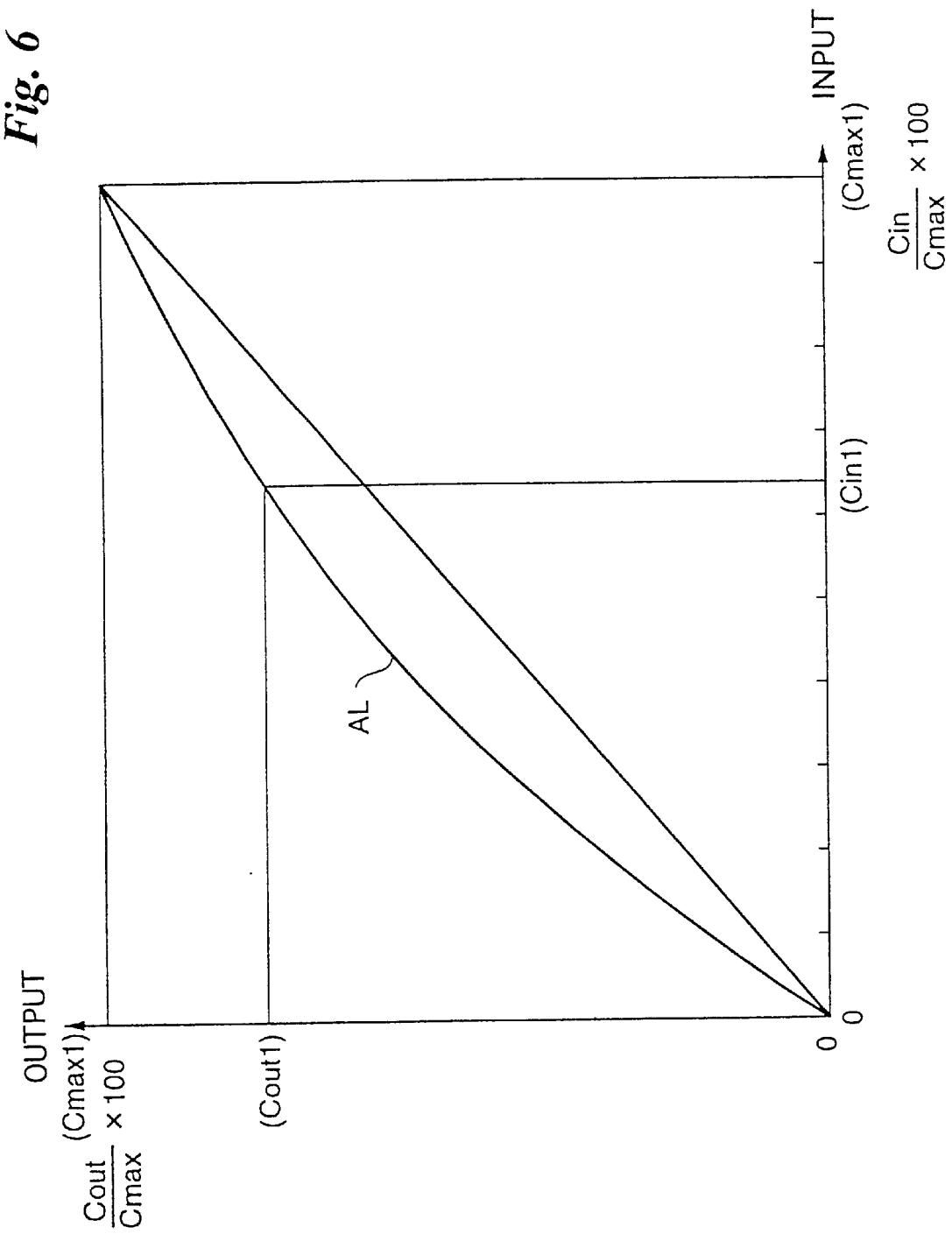
FIG. 6 is a graph showing a saturation correction curve.

FIG. 6 illustrates a saturation correction curve for correcting saturation.

One saturation correction curve is determined for each image corresponding to one frame which should be corrected.

The saturation correction curve is for outputting, when input is minimum saturation 0 or maximum saturation Cmax, the saturation as it is at a value inputted without emphasizing the saturation. When the input is intermediate saturation between the minimum saturation and the maximum saturation, the saturation is emphasized.

Referring to FIGS. 5 and 6, it is assumed that pixel data representing one of pixels composing an image corresponding to one frame which should be corrected exists at a point $C_1$ in FIG. 5. The procedure for correcting the saturation of the pixel data at the point $C_1$ using the correction curve shown in FIG. 6 will be described.

FIG. 7 is a graph for explaining the procedure for making saturation correction using the correction curve.

First consider a straight line SL connecting the origin and the point $C_1$. The straight line SL is further extended, and the intersection of the straight line SL and the solid line L in the boundary of the color reproduction region is taken as Cmax1 (an angle θ formed between the straight line SL and the Cb axis is a hue angle, described later). The ratio of a length between the origin O and Cin1 to a length between the origin O and Cmax1 in FIG. 6 is determined such that it is the same as the ratio of a length between the origin O and $C_1$ to a length between the origin O and Cmax1 in FIG. 5 (see FIG. 7). An output Cout1 corresponding to the position of the input Cin1 is found from the saturation correction curve. The found output Cout1 is a color difference after the saturation correction.

Specifically, the saturation correction curve is expressed by the following equation 7:

$$Cout = \frac{Cmax}{100}\left[\sqrt{a^2 + (100-a)^2 - \left(100\frac{Cin}{Cmax} - a\right)^2} + 100 - a\right] \quad \text{equation 7}$$

where a is a parameter in the saturation correction curve, which determines a curvature. The parameter a is expressed by the following equation 8:

$$a = 2.5Cmean + 180 \quad \text{equation 8}$$

Cmean is the average saturation of image data representing an image corresponding to one frame whose saturation should be corrected.

The larger the average saturation Cmean is, the larger the value of the parameter a is. Consequently, the correction amount of the saturation is decreased. Conversely, the smaller the average saturation Cmean is, the smaller the value of the parameter a is. Consequently, the correction amount of the saturation is increased.

In the present embodiment, the saturation correction is made in accordance with the correction curve shown in FIG. 6 in consideration of the color reproduction region in the YCbCr color space, as described above.

Figure 8:
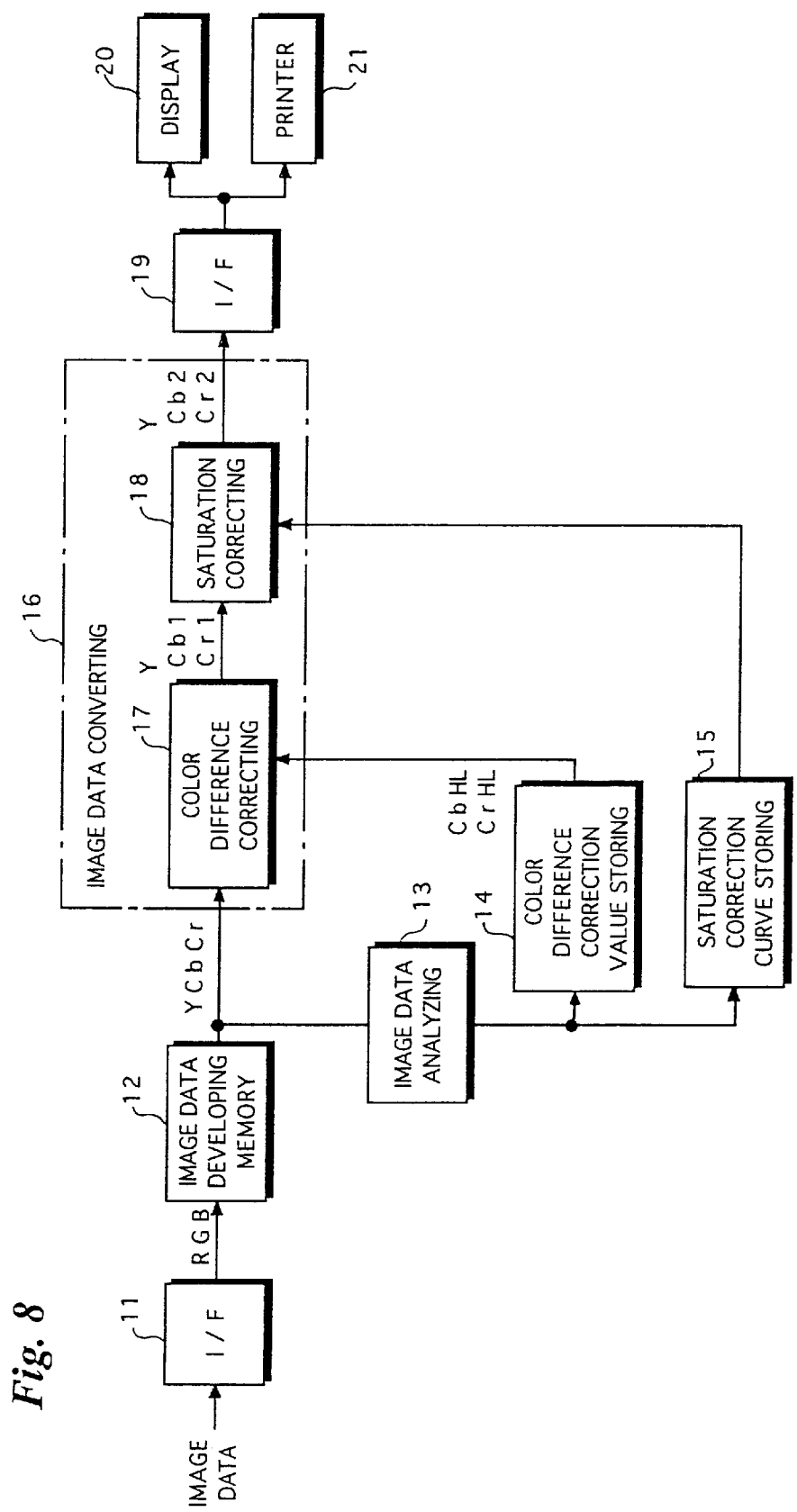
FIG. 8 is a block diagram showing the electrical configuration of a saturation correcting apparatus.
Figure 9:
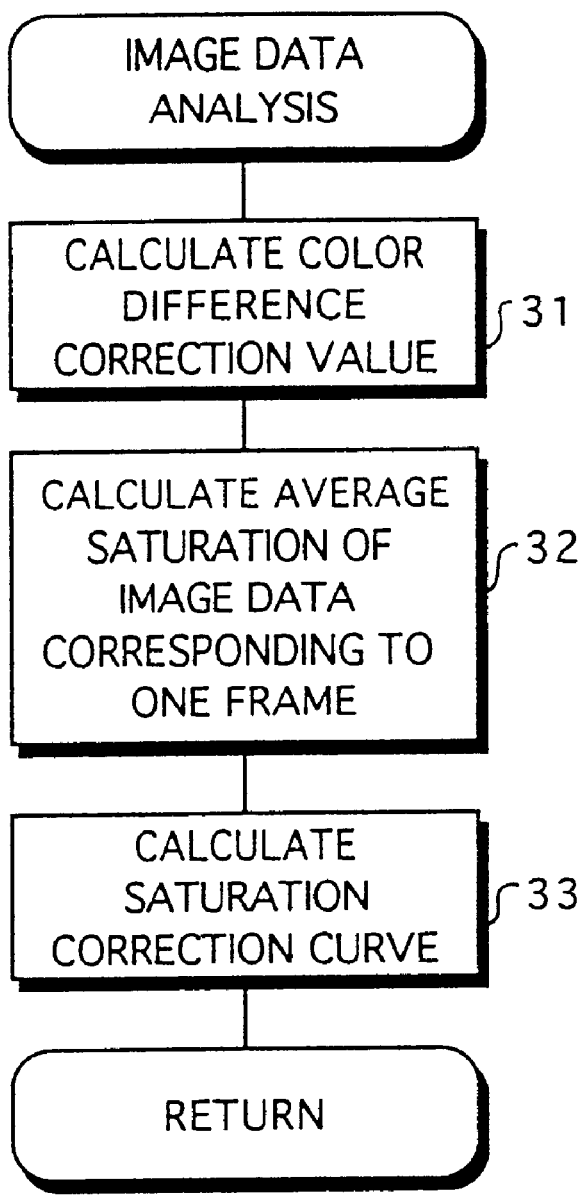
FIG. 9 is a flow chart showing the procedure for image data analysis processing.
Figure 10:
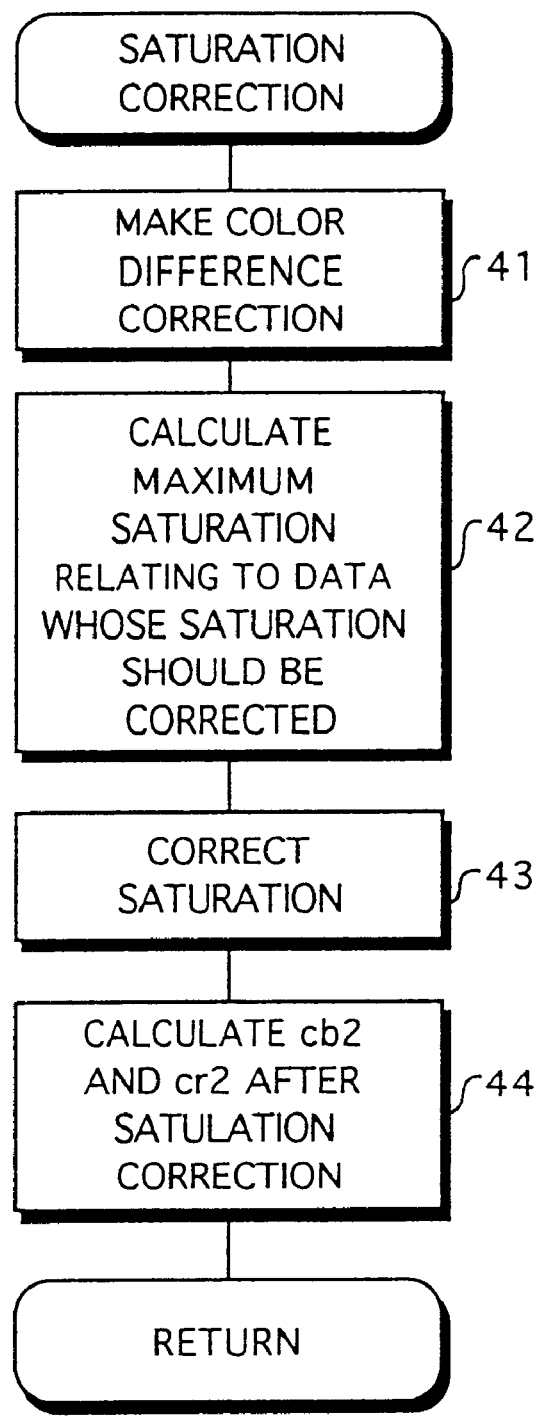
FIG. 10 is a flow chart showing the procedure for saturation correction processing.

FIG. 8 is a block diagram showing the electrical configuration of a saturation correcting apparatus. FIG. 9 is a flow chart showing the procedure for image data analysis processing in an image data analyzing circuit included in the saturation correcting apparatus. FIG. 10 is a flow chart showing the procedure for saturation correction processing.

RGB image data representing an image corresponding to one frame which is outputted from a digital still camera, a scanner, or the like is fed to an interface 11, and is inputted to the saturation correcting apparatus. The RGB image data corresponding to one frame is fed to an image data developing memory 12, and is temporarily stored therein.

In the image data developing memory 12, the inputted RGB image data is converted into luminance data Y and color difference data Cb and Cr, and the luminance data Y and the color difference data Cb and Cr are outputted. The luminance data Y and the color difference data Cb and Cr which have been outputted from the image data developing memory 12 are inputted to an image data analyzing circuit 13.

In the image data analyzing circuit 13, a color difference correction value is calculated (step 31 in FIG. 9). Specifically, averages of the color difference data Cb and Cr corresponding to the luminance data, which has a high luminance within 1% from its maximum value, are calculated. The averages CbHL and CrHL of the color difference data Cb and Cr are taken as color difference correction values. The averages of the color difference data Cb and Cr corresponding to all pixels may be calculated, to correct the color difference correction values using the calculated averages. The calculated color difference correction values are fed to a color difference correction value storing circuit 14, and are temporarily stored therein.

The average chromaticity (saturation) Cmean of the color difference data Cb and Cr corresponding to one frame is then calculated, as described above (step 32 in FIG. 8). When the average saturation Cmean is calculated, the above-mentioned parameter a is calculated in accordance with the foregoing equation 8 using the calculated average saturation Cmean. A correction curve expressed by the foregoing equation 7 is calculated using the parameter a (step 33 in FIG. 9). Data representing the calculated correction curve is fed to a saturation correction curve storing circuit 15 from the image data analyzing circuit 13, and is temporarily stored therein.

The luminance data Y and the color difference data Cb and Cr corresponding to one pixel whose saturation should be corrected out of the image data representing the image corresponding to one frame stored in the image data developing memory 12 are inputted to a color difference correcting circuit 17 in an image data converting circuit 16.

The color difference correction values CbHL and CrHL which are temporarily stored in the color difference correction value storing circuit 14 are also fed to the color difference correcting circuit 17. In the color difference correcting circuit 17, the color difference correction value CbHL is subtracted from the inputted color difference data Cb, so that color difference data Cb1 after the color difference correction is obtained. Further, the color difference correction value CrHL is subtracted from the inputted color difference data Cr, so that color difference data Cr1 after the color difference correction is obtained. The color difference correction is thus made (step 41).

The color difference correction makes it possible to reduce so-called color fogging (green color fogging of a fluorescent lamp, orange color fogging of tungsten light, etc.) at the time of imaging image data inputted to the saturation correcting apparatus.

The luminance data Y and the color difference data Cr1 and Cb1 which are outputted from the color difference correcting circuit 17 are inputted to a saturation correcting circuit 18. In the saturation correcting circuit 18, saturation correction, described later, is made.

Maximum saturation Cmax1 relating to data whose saturation should be corrected (a point at which a line extending a straight line connecting the origin O and the data whose saturation should be corrected crosses a solid line L, as shown in FIG. 5) is first calculated (step 42). The maximum saturation Cmax1 can be calculated using the luminance data Y and a hue angle θ. The hue angle θ is obtained from the following equation 9 using the color difference data Cb1 and Cr1:

$$\theta = \frac{180}{\pi} \cdot \tan^{-1}\left(\frac{Cr1}{Cb1}\right) \qquad \text{equation 9}$$

The calculated maximum saturation Cmax1 (=Cmax), the parameter a, and a color difference Cin1 (Cin) to be corrected are inputted to the correction curve expressed by the foregoing equation 7. Consequently, saturation correction processing is performed (step 43). In this case, Cin1 is obtained from the following equation 10:

$$Cin1 = \sqrt{(Cb1^2 + Cr1^2)} \qquad \text{equation 10}$$

Color difference data Cb2 and Cr2 after the saturation correction are calculated in accordance with the following equation 11 from a color difference Cout1(Cout) obtained after the saturation correction (step 44):

$$Cb2 = Cb1 \cdot (Cout/Cin)$$

$$Cr2 = Cr1 \cdot (Cout/Cin) \qquad \text{equation 11}$$

The color difference correction and the saturation correction are repeated with respect to the luminance data Y and the color difference data Cb and Cr corresponding to each and every pixel included in one frame. When the color difference correction and the saturation correction are made with respect to the luminance data Y and the color difference data Cb and Cr corresponding to one frame, the image data corresponding to one frame after the correction is inputted to a display device 20 and a printer 21 through an interface 19. Consequently, an image whose saturation has been emphasized is displayed on a display screen of the display device 20. The image whose saturation has been emphasized is printed by the printer 21.

In the present embodiment, the saturation correction can be made such that the color difference data after the saturation correction is not saturated. It is possible to prevent color compression from occurring in the displayed image or the printed image.

Although the above-mentioned correction curve may be a circular arc, it may be a polygonal line. Even when the correction curve is a polygonal line, it goes without saying that the saturation after the correction is determined not to exceed the maximum saturation.

Although description was made of a case where the saturation data is outputted as it is without being corrected when it represents the maximum saturation or the minimum saturation, correction for decreasing the maximum saturation or correction for increasing the minimum saturation may be made. Further, although the correction is for emphasizing the saturation, it may be correction for decreasing the saturation. In the case, at least one of the maximum saturation and the minimum saturation may not be corrected.

Although in the above-mentioned embodiment, the correction processing is all performed by calculation processing, the correction processing may be performed by previously performing calculation processing, storing the calculated data as table data, and reading out the calculated data from the memory, as required.

Description is now made of a method of calculating the above-mentioned maximum saturation Cmax.

In order to calculate the maximum saturation Cmax in the present embodiment, a first range in which each of RGB image data takes a value of not more than its maximum value (not more than 255, including negative value) in luminance Y=0 (minimum luminance) and a second range in which each of the RGB image data takes a value of not less than its minimum value (not less than 0, including not less than 255) are first detected. Maximum saturation (first maximum saturation) in the range in which each of the RGB image data takes a value of not more than the maximum value in the luminance Y=0 and maximum saturation (second maximum saturation) in the range in which each of the RGB image data takes a value of not less than the minimum value in the luminance Y=255 are then found in the hue of one pixel whose maximum saturation should be found. The saturation having the smaller value out of the found first maximum saturation and second maximum saturation is taken as the maximum saturation Cmax to be found.

The first range is first found.

Figure 11:
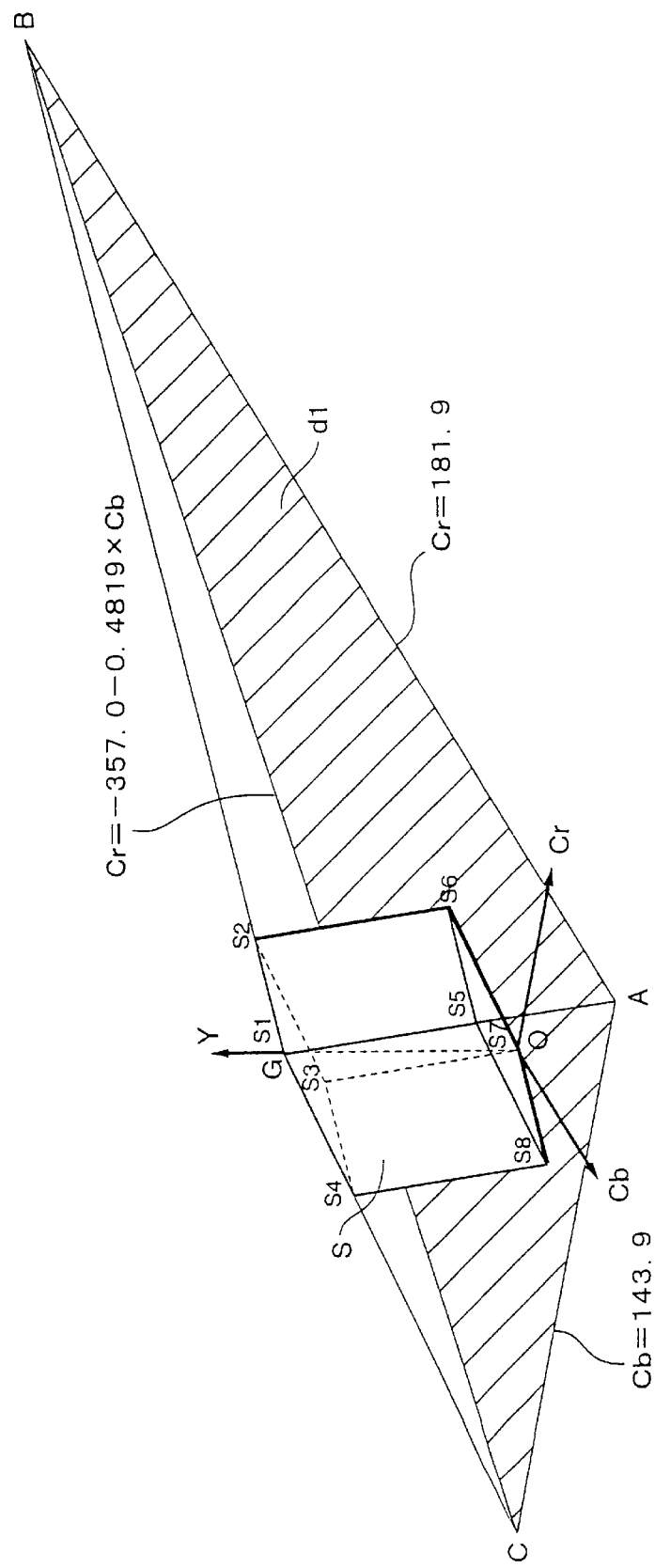
FIG. 11 illustrates a YCbCr color space.
Figure 12:
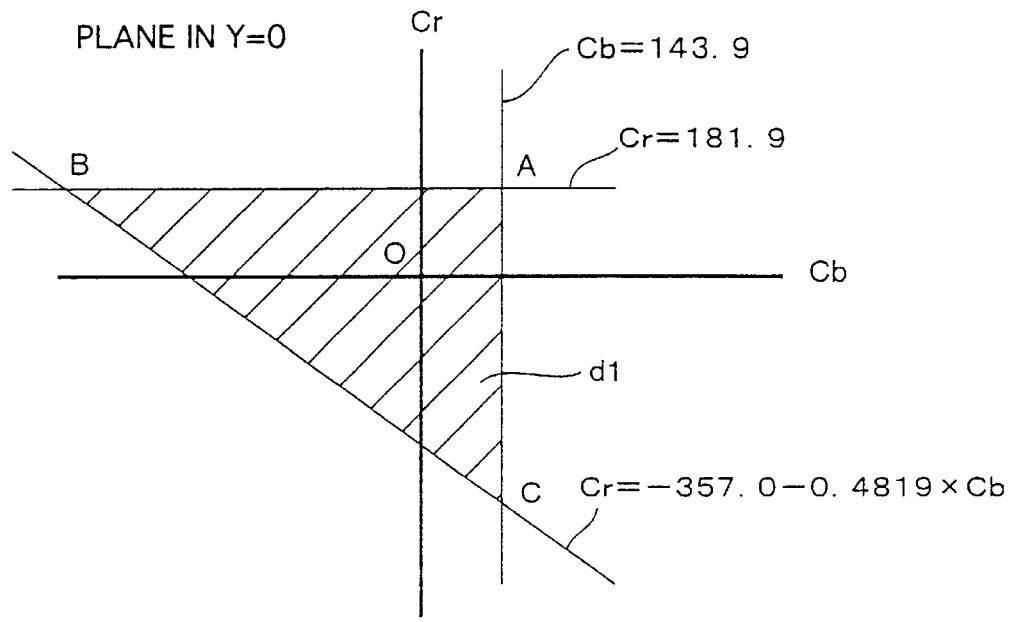
FIGS. 12 and 13 illustrate a first range of saturation which can be taken on a Cb-Cr plane in minimum luminance.
Figure 13:
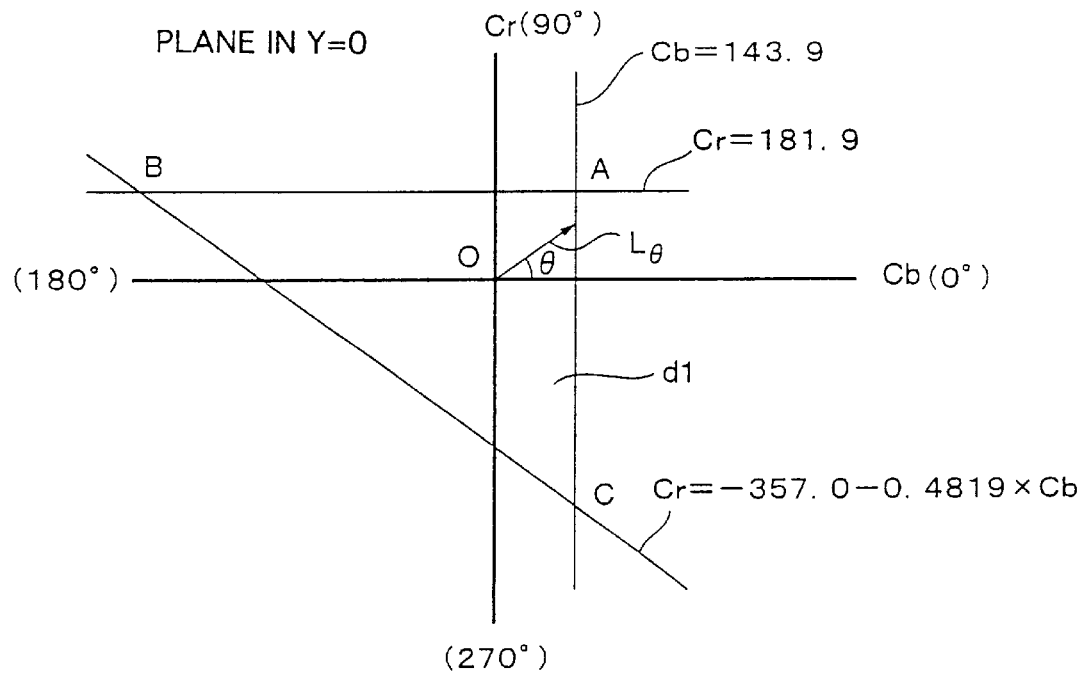

FIG. 11 illustrates, on a color space defined by luminance Y and color differences Cb and Cr, a triangle (indicated by hatching) in the first range (enclosed by respective planes satisfying R=G=B=255) d1 in which each of the RGB image data takes the value of not more than the maximum value in the luminance Y=0. In FIG. 11, the above-mentioned solid S is also illustrated. FIGS. 12 and 13 illustrate, on a Cb-Cr plane, the triangle in the first range d1 in which each of the RGB image data takes the value of not more than the maximum value in the luminance Y=0.

The equations 2 and 3 can be rewritten as the following equations 12 and 13 (respectively obtained by multiplexing the equations 2 and 3 by coefficients because R, G, and B are in the range of 0 to 255).

$$Cr = (R-Y) \times 0.7132 \qquad \text{equation 12}$$

$$Cb = (B-Y) \times 0.5643 \qquad \text{equation 13}$$

The first range d1 can be found in the following manner while referring to the equation 1 and the equations 12 and 13.

In Y=0, the boundary of B=255 is first found. When Y=0 and B=255 are substituted in the equation 13, the following equation 14 is obtained:

$$Cb = (255 - 0) \times 0.5643 \qquad \text{equation 14}$$
$$= 255 \times 0.5643$$
$$= 143.9$$

The equation 14 is an equation constituting one side of the triangle in the first range d1.

In Y=0, the boundary of R=255 is then found. When Y=0 and R=255 are substituted in the equation 12, the following equation is obtained:

$$Cr = (255 - 0) \times 0.7132 \qquad \text{equation 15}$$
$$= 255 \times 0.7132$$
$$= 181.9$$

The equation 15 is an equation constituting another side of the triangle in the first range d1.

Furthermore, the boundaries of Y=0 and G=255 are found. When Y=0 and G=255 are substituted in the equation 1, the following equation 16 is obtained:

$$0 = 0.299 \times R + 0.587 \times 255 + 0.114 \times B \qquad \text{equation 16}$$

When Y=0 and G=255 are substituted in the equations 12 and 13, the following equations 17 and 18 are obtained:

$$Cr = (R-0) \times 0.7132 \qquad \text{equation 17}$$

$$Cb = (B-0) \times 0.5643 \qquad \text{equation 18}$$

When the equations 17 and 18 are changed, the following equations 19 and 20 are obtained:

$$R = Cr/0.7132 \qquad \text{equation 19}$$

$$B = Cb/0.5643 \qquad \text{equation 20}$$

When the equations 19 and 20 are substituted in the equation 16, the following equation 21 is obtained:

$$0 = 0.2999 \times Cr/0.7132 + 0.587 \times 255 + 0.114 \times Cb/0.5643 \qquad \text{equation 21}$$

When the equation is changed and arranged, the following equation 22 is obtained:

$$Cr = -357.0 - 0.4819 \times Cb \qquad \text{equation 22}$$

The equation 22 indicates the last one side constituting the triangle in the first range d1.

Letting s1 to s8 be the vertices of the solid S, the triangle in the first range d1 thus found is a triangle having a vertex A on an extension of the line connecting the vertices s1 and s5, having a vertex B on an extension of the line connecting the vertices s1 and s2, and having a vertex C on an extension of the line connecting the vertices s1 and s4 with reference to FIG. 11.

When the first range d1 is found from the equations 14, 15, and 22 in the above-mentioned manner, an equation for calculating the distance from the origin Cb=Cr=0 on the Cb-Cr plane in Y=0 to the periphery of the first range d1 (the distance represents the maximum saturation) is found.

As described above, the intersection of the side represented by Cr=181.9 and the side represented by Cb=143.9, the intersection of the side represented by Cr=181.9 and the side represented by Cr=−357.0−0.4819×Cb, and the intersection of the side represented by Cr=−357.0−0.4819×Cb and the side represented by Cb=143.9 are respectively taken as the vertices A, B, and C of the triangle in the first range d1.

Referring to FIG. 13, when an angle formed between a line Lθ connecting the origin Cb=Cr=0 and a point on the side constituting the triangle in the first range d1 and the Cb axis is taken as θ (θ indicates a hue, as described above), the distance max θ0[θ] from the origin Cb=Cr=0 to the side of the triangle in the first range d1 differs depending on the angle θ.

When the angle θ is not less than 0° and less than 52° (when the line connecting the origin Cb=Cr=0 and the point on the side constituting the triangle in the first range d1 is between the axis Cb and a line connecting the origin Cb=Cr=0 and the vertex A), the distance maxθ0[θ] from the origin Cb=Cr=0 to the side constituting the triangle in the first range d1 is found from the following equation 23:

$$\max\theta 0[\theta]=\sqrt{\{143.9\times 143.9+(143.9\times\tan(\theta))^2\}} \quad \text{equation 23}$$

When the angle θ is not less than 52° and less than 170° (when the line connecting the origin Cb=Cr=0 and the point on the side constituting the triangle in the first range d1 is between the line connecting the origin Cb=Cr=0 and the vertex A and a line connecting the origin Cb=Cr=0 and the vertex B), this distance is found from the following equation 24:

$$\max\theta 0[\theta]=\sqrt{\{181.9\times 181.9+(181.9/\tan(\theta))^2\}} \quad \text{equation 24}$$

When the angle θ is not less than 170° and less than 289° (when the line connecting the origin Cb=Cr=0 and the point on the side constituting the triangle in the first range d1 is between the line connecting the origin Cb=Cr=0 and the vertex B and a line connecting the origin Cb=Cr=0 and the vertex C), this distance is found from the following equation 25

$$\max\theta 0[\theta]=\sqrt{(Cr\times Cr+Cb\times Cb)} \quad \text{equation 25}$$

where Cr=−357.0/(1+0.4819/tan(θ)) (obtained by substituting Cb=Cr/tan(θ) in the equation 22), and Cb=−357.0/tan(θ)/(1+0.4819/tan(θ)) (obtained by substituting the equation 22 in Cb=Cr/tan(θ)).

When the angle θ is not less than 289° and less than 360° (when the line connecting the origin Cb=Cr=0 and the point on the side constituting the triangle in the first range d1 is between the line connecting the origin Cb=Cr=0 and the vertex C and the axis Cb), this distance is found from the following equation 26:

$$\max\theta 0[\theta]=\sqrt{\{143.9\times 143.9+(143.9\times\tan(\theta))^2\}} \quad \text{equation 26}$$

A triangle in a second range d2 in which each of the RGB image data takes a value of not less than its minimum value in luminance Y=255 is then found.

Figure 14:
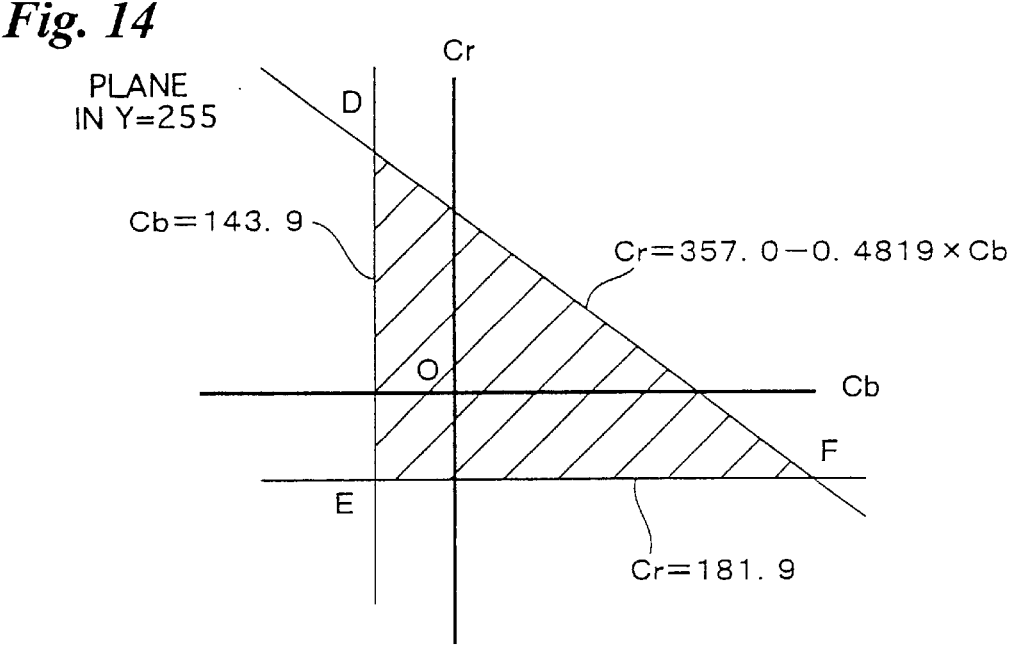
FIGS. 14 and 15 illustrate a second range of saturation which can be taken on a Cb-Cr plane in maximum luminance.
Figure 15:
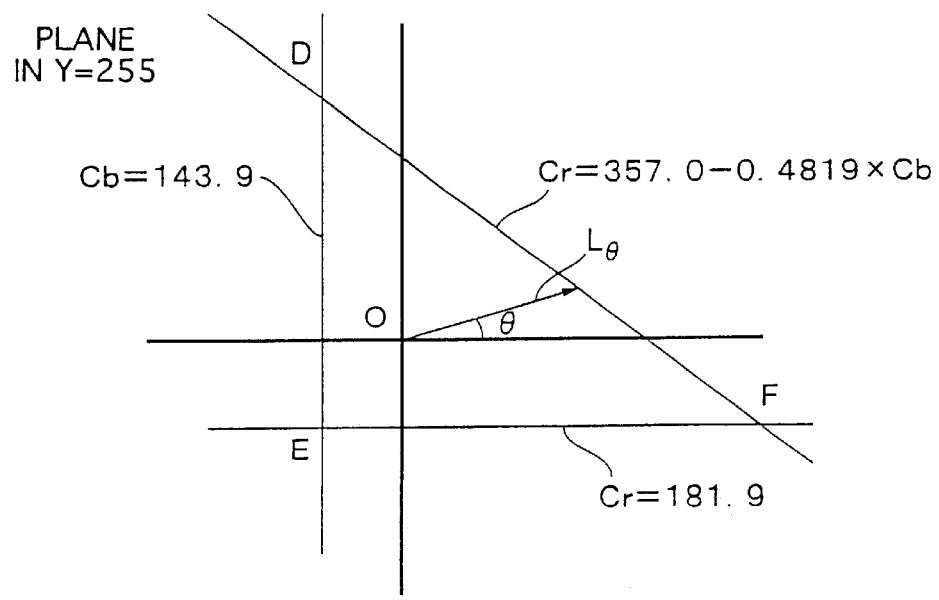

FIGS. 14 and 15 illustrate, on a Cb-Cr plane, the triangle in the second range (enclosed by respective planes satisfying R=G=B=0) d2 in which each of the RGB image data takes the value of not less than the minimum value in the luminance Y=255.

The second range d2 can be found in the following manner while referring to the foregoing equations 1, 12, and 13.

In Y=255, the boundary of B=0 is first found. When Y=255 and B=0 are substituted in the equation 13, the following equation is obtained:

$$Cb = (0-255)\times 0.5643 \quad \text{equation 27}$$
$$= -255\times 0.5643$$
$$= -143.9$$

The equation 27 is an equation constituting one side of the triangle in the second range d2.

In Y=255, the boundary of R=0 is then found. When Y=255 and R=0 are substituted in the equation 12, the following equation is obtained:

$$Cr = (0-255)\times 0.7132 \quad \text{equation 28}$$
$$= -255\times 0.7132$$
$$= -181.9$$

The equation 28 is an equation constituting another side of the triangle in the second range d2.

Furthermore, the boundaries of Y=255 and G=0 are found. When Y=255 and G=0 are substituted in the equation 1, the following equation 29 is obtained:

$$0=0.299\times R+0.587\times G+0.114\times B \quad \text{equation 29}$$

When Y=255 and G=0 are substituted in the equations 12 and 13, the following equations 30 and 31 are obtained:

$$Cr=(R-255)\times 0.7132 \quad \text{equation 30}$$
$$Cb=(B-255)\times 0.5643 \quad \text{equation 31}$$

When the equations 30 and 31 are changed, the following equations 32 and 33 are obtained:

$$R=Cr/0.7123+255 \quad \text{equation 32}$$
$$B=Cb/0.5643+255 \quad \text{equation 33}$$

When the equations 32 and 33 are substituted in the equation 29, the following equation 34 is obtained:

$$255=0.299\times Cr/0.7132+0.114\times Cb/0.5643+0.587\times 255 \quad \text{equation 34}$$

When the equation 34 is changed and arranged, the following equation 35 is obtained:

$$Cr=357.0-0.4819\times Cb \quad \text{equation 35}$$

The equation indicates the last one side constituting the triangle in the second range d2.

When the second range d2 is found from the equations 27, 28, and 35 in the above-mentioned manner, an equation for calculating the distance from the origin Cr=Cb=0 on the Cb-Cr plane in Y=255 to the periphery of the second range d2 is found.

The intersection of the side represented by Cr=357.0−0.4819×Cb and the side represented by Cb=143.9, the intersection of the side represented by Cr=181.9 and the side represented by Cb=143.9, and the intersection of the side represented by Cr=−357.0−0.4819×Cb and the side represented by Cb=143.9 are respectively taken as the vertices D, E, and F of the triangle in the second range d2.

As in the above-mentioned first range d1, when an angle formed between a line Lθ connecting the origin Cb=Cr=0 and a point on the side constituting the triangle in the second range d2 and the Cb axis is taken as θ (θ indicates a hue, as described above), the distance maxθ255[θ] from the origin Cb=Cr=0 to the side of the triangle in the second range d2 differs depending on the angle θ.

When the angle θ is not less than 0° and less than 110° (when the line connecting the origin Cb=Cr=0 and the point on the side constituting the triangle in the second range d2 is between the axis Cb and a line connecting the origin Cb=Cr=0 and the vertex D), the distance maxθ0255[θ] from the origin Cb=Cr=0 to the side constituting the triangle in the second range d2 is found from the following equation 36:

$$\max\theta 255[\theta]=\sqrt{(Cr\times Cr+Cb\times Cb)} \quad \text{equation 36}$$

where Cr=357.0/(1+0.4819/tan(θ)) (obtained by substituting Cb=Cr/tan(θ) in the equation 35), and Cb=357.0/tan(θ)/(1+0.4819/tan(θ)) (obtained by substituting the equation 35 in Cb=Cr/tan(θ)).

When the angle θ is not less than 110° and less than 232° (when the line connecting the origin Cb=Cr=0 and the point on the side constituting the triangle in the second range d2 is between the line connecting the origin Cb=Cr=0 and the vertex D and a line connecting the origin Cb=Cr=0 and the vertex E), this distance is found from the following equation 37:

$$\max\theta 255[\theta] = \sqrt{\{143.9 \times 143.9 + (143.9 \times \tan(\theta))^2\}} \qquad \text{equation 37}$$

When the angle θ is not less than 232° and less than 351° (when the line connecting the origin Cb=Cr=0 and the point on the side constituting the triangle in the second range d2. is between the line connecting the origin Cb=Cr=0 and the vertex E and a line connecting the origin Cb=Cr=0 and the vertex F), this distance is found from the following equation 38:

$$\max\theta 255[\theta] = \sqrt{\{181.9 \times 181.9 + (181.9 \times \tan(\theta))^2\}} \qquad \text{equation 38}$$

When the angle θ is not less than 351° and less than 360° (when the line connecting the origin Cb=Cr=0 and the point on the side constituting the triangle in the second range d2 is between the line connecting the origin Cb=Cr=0 and the vertex F and the axis Cb), this distance is found from the following equation 39 (which is the same as the equation 36):

$$\max\theta 255[\theta] = \sqrt{(Cr \times Cr + Cb \times Cb)} \qquad \text{equation 39}$$

Figure 16:
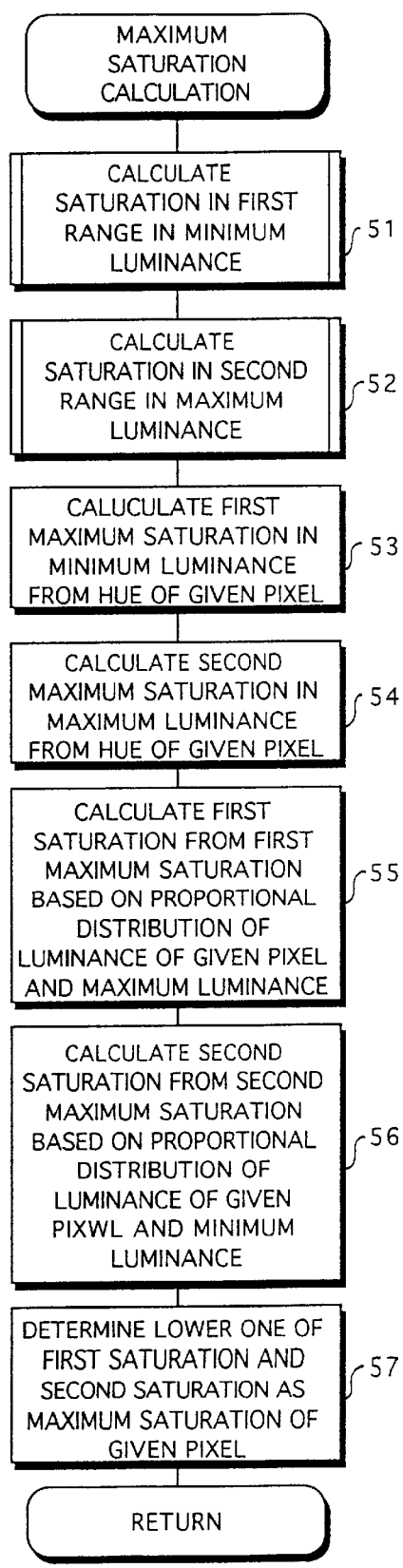
FIG. 16 is a flow chart showing maximum saturation calculation processing.

FIG. 16 is a flow chart showing the procedure for processing for calculating maximum saturation.

As described above, saturation in a first range in which each of RGB image data takes a value of not more than its maximum value in minimum luminance (Y=0) and saturation in a second range in which each of the RGB image data takes a value of not less than its minimum value in maximum luminance (Y=255) are respectively calculated (steps 51 and 52). The calculated saturation is stored for each angle (for each hue).

The maximum saturation in the first range (referred to as first maximum saturation) in the minimum luminance of a pixel whose maximum saturation should be found is then calculated (step 53). The first maximum saturation is calculated from the hue of the given pixel.

When it is assumed that the luminance and the color differences of the given pixel are respectively Y=150, Cr=10, and Cb=10, the hue θ is 45° The values are substituted in the equation 23 in order to find the first maximum saturation. Consequently, the first maximum saturation is obtained from the following equation 40:

$$\max\theta 0[45] = \sqrt{\{143.9 \times 143.9 + (143.9 \times 0.5)^2\}} = 161 \qquad \text{equation 40}$$

The maximum saturation (referred to as second maximum saturation) which can be taken in the maximum luminance of the pixel whose maximum saturation should be found is then calculated (step 54). When Cr=10, Cb=10, and θ=45 are substituted in the equation 36, the second maximum saturation is obtained from the following equation 41:

$$\max\theta 255[45] = \sqrt{(181.8 \times 181.1 + 363.6 \times 363.6)} = 407 \qquad \text{equation 41}$$

The first maximum saturation and the second maximum saturation may be thus calculated from the equations 40 and 41. Since the saturation calculated at the steps 51 and 52 is stored, however, it goes without saying that from the stored saturation, the first maximum saturation and the second maximum saturation which correspond thereto may be extracted.

Since the luminance of the pixel whose maximum saturation should be found is Y=150, the calculated first maximum saturation is distributed by proportional distribution depending on the luminance. Consequently, the first maximum saturation corresponding to the luminance is obtained (step 55). Specifically, the first maximum saturation r1 is obtained from the following equation 42:

$$r1 = \max\theta 0[45] \times 150/255 = 95 \qquad \text{equation 42}$$

Similarly, the calculated second maximum saturation is distributed by proportional distribution depending on the luminance. Consequently, the second maximum saturation corresponding to the luminance is obtained (step 56). Specifically, the second maximum saturation r2 is obtained from the following equation 43:

$$r2 = \max\theta 255[45] \times (255-150)/255 = 168 \qquad \text{equation 43}$$

The saturation having the smaller value out of the first maximum saturation and the second saturation which are obtained in consideration of the luminance is determined as the maximum saturation Cmax of the pixel whose maximum saturation should be found (step 57).

The above-mentioned maximum saturation Cmax is thus calculated.

Figure 17:
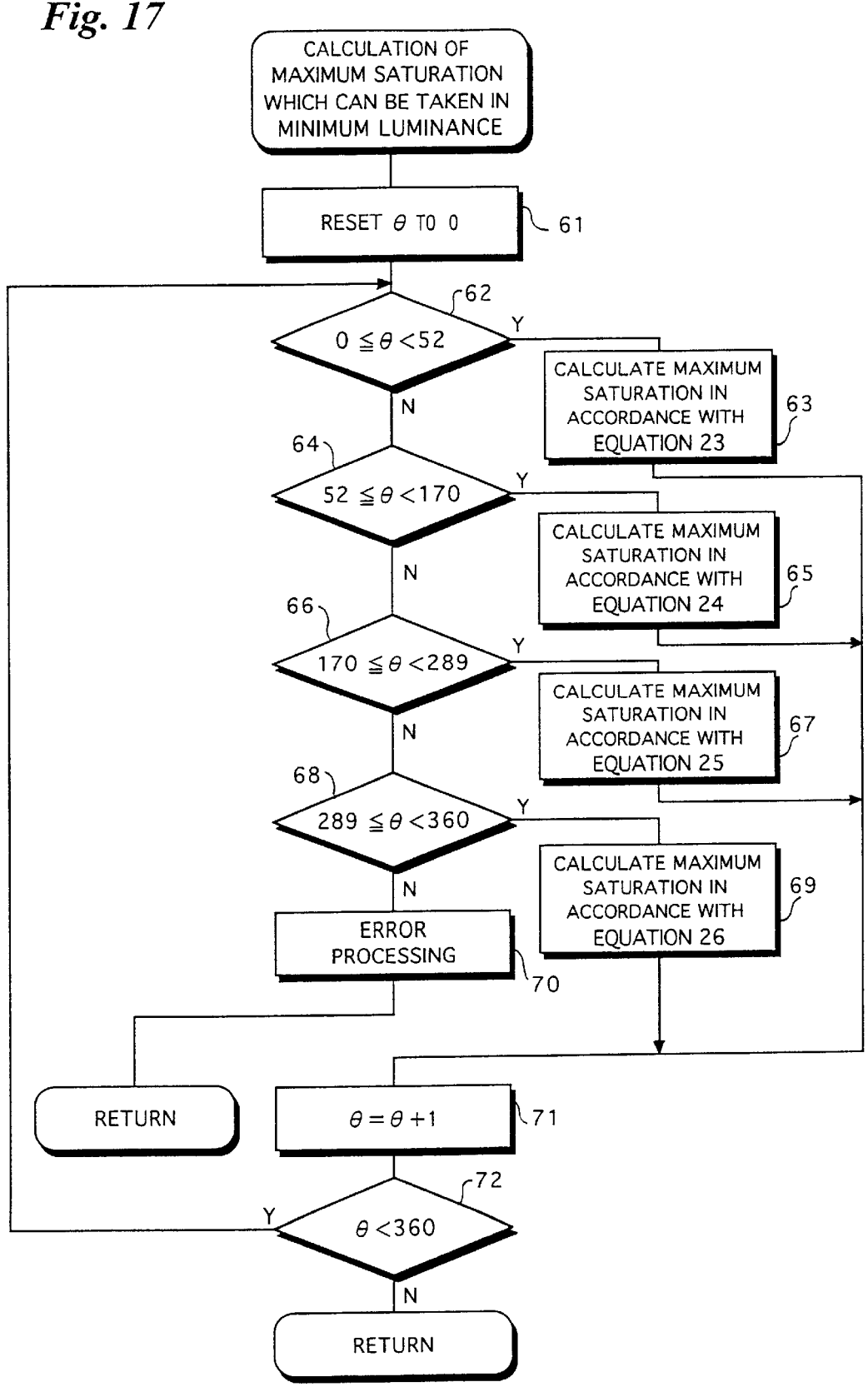
FIG. 17 is a flow chart showing processing for calculating maximum saturation which can be taken in minimum luminance.

FIG. 17 is a flow chart showing the procedure for processing for calculating the maximum saturation in the first range which can be taken in the minimum luminance (the processing at the step 51 in FIG. 16).

The maximum saturation is calculated for each hue, as described above, so that the angle θ is reset to zero (step 61).

It is checked whether or not the angle θ is not less than 0 and less than 52° (step 62), whether or not it is not less than 52° and less than 170° (step 64), whether or not it is not less than 170° and less than 289° (step 66), and whether or not it is not less than 289° and less than 360° (step 68).

If the angle θ is not less than 0° and less than 52° (YES at step 62), the maximum saturation is calculated in accordance with the equation 23, as described above. The calculated maximum saturation is stored in correspondence with the angle θ. θ is then incremented by one degree (step 71). The processing at the steps 62 to 70 is repeated until the angle θ reaches 360° (step 72).

If the angle θ is not less than 52° and less than 170° (YES at step 64), the maximum saturation is calculated in accordance with the equation 24 (step 65). Similarly, if the angle θ is not less than 170° and less than 289° (YES at step 66), the maximum saturation is calculated in accordance with the equation 25 (step 67). If the angle θ is not less than 289° and less than 360° (YES at step 68), the maximum saturation is calculated in accordance with the equation 26 (step 69).

When the answer is in the negative at all the steps 62, 64, 66, and 68, error processing is performed (step 70).

Figure 18:
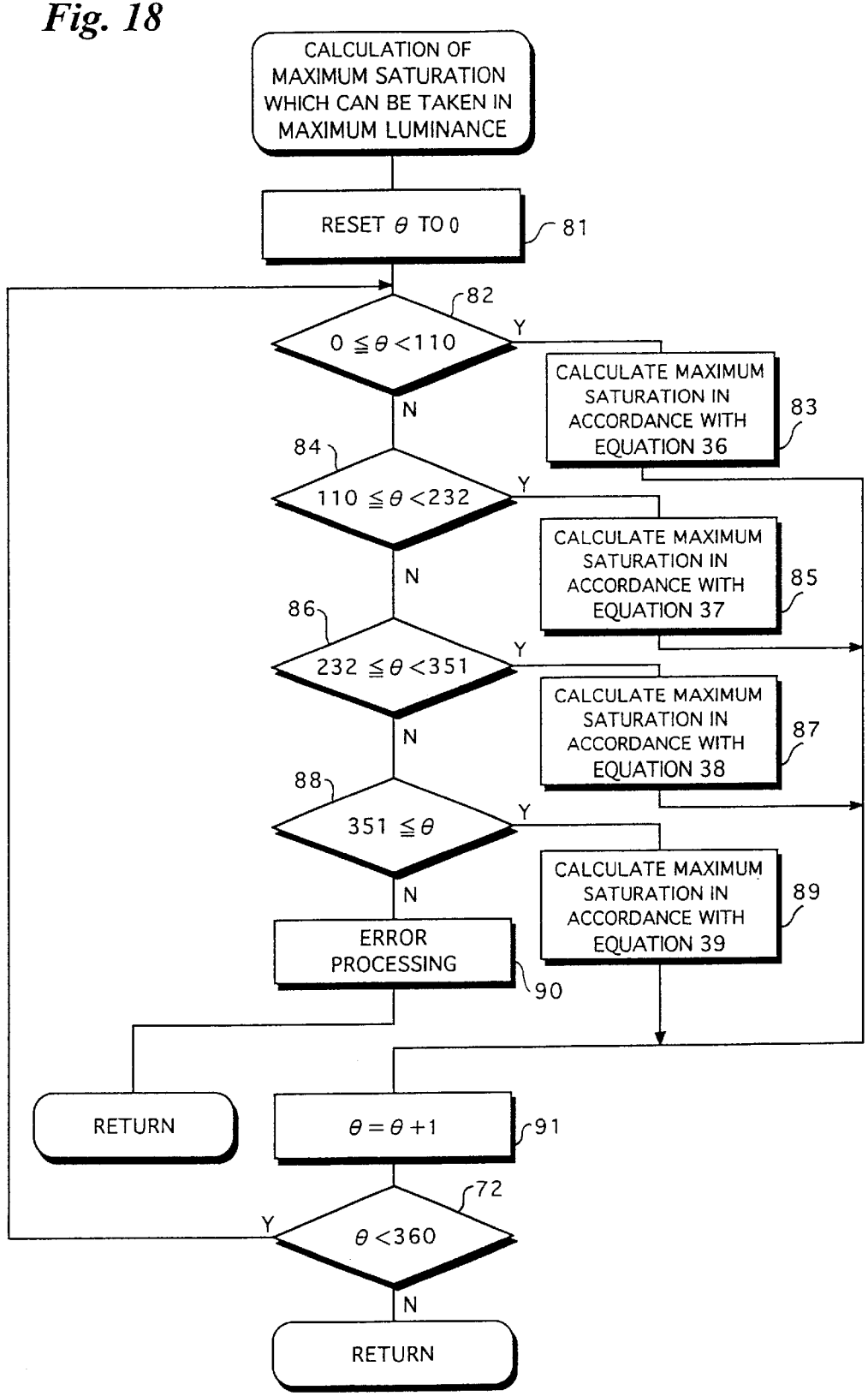
FIG. 18 is a flow chart showing processing for calculating maximum saturation which can be taken in maximum luminance.

FIG. 18 is a flow chart showing the procedure for processing for calculating the maximum saturation which can be taken in the minimum luminance (the processing at the step 52 in FIG. 16).

The maximum saturation is calculated for each hue, as described above, so that the angle θ is reset to zero (step 81).

It is checked whether or not the angle θ is not less than 0° and less than 110° (step 82), whether or not it is not less than 110° and less than 232° (step 84), whether or not it is not less than 232° and less than 351° (step 86), and whether or not it is not less than 351° and less than 360° (step 88).

If the angle α is not less than 0° and less than 110° (YES at step 82), the maximum saturation is calculated in accordance with the equation 36 (step 83), as described above.

The calculated maximum saturation is stored in correspondence with the angle θ. θ is then incremented by one degree (step 91). The processing at the steps 82 to 90 is repeated until the angle θ reaches 360° (step 92).

If the angle θ is not less than 110° and less than 232° (YES at step 84), the maximum saturation is calculated in accordance with the equation 37 (step 85). Similarly, if the angle θ is not less than 232° and less than 351° (YES at step 86), the maximum saturation is calculated in accordance with the equation 38 (step 87). If the angle θ is not less than 351° and less than 360° (YES at step 88), the maximum saturation is calculated in accordance with the equation 39 (step 89).

When the answer is in the negative at all the steps 82, 84, 86, and 88, error processing is performed (step 90).

As described above, the maximum saturation in the minimum luminance Y=0 and the maximum saturation in the maximum luminance Y=255 are calculated, to calculate the maximum saturation which can be taken in two types of different luminance in FIGS. 17 and 18. When the arithmetic mean of the two types of luminance, that is, Y=0 and Y=255 is intermediate luminance Y=128, however, it is also possible to utilize an equation for calculating the maximum saturation which can be taken in the one luminance to calculate the maximum saturation which can be taken in the other luminance.

Figure 19:
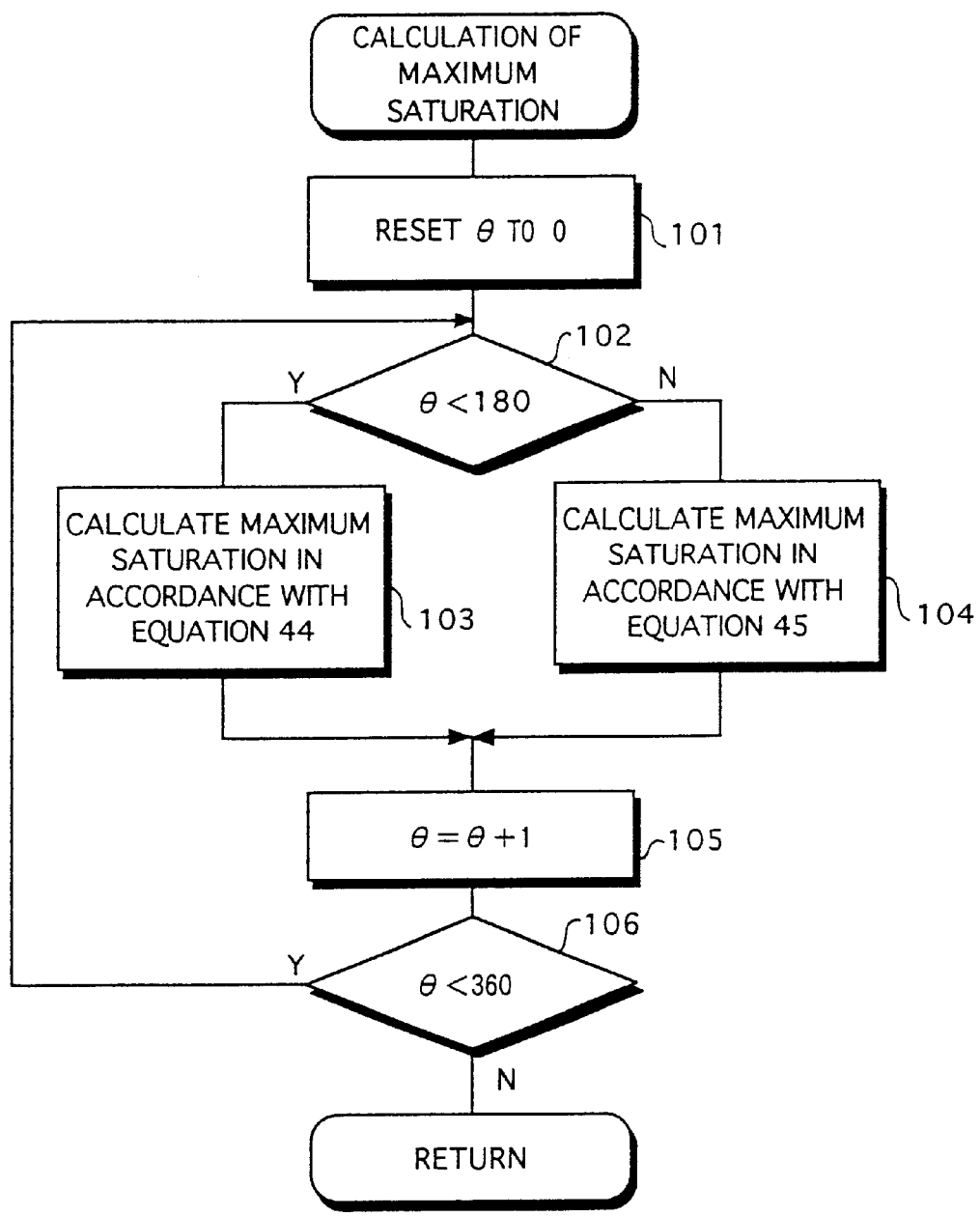
FIG. 19 is a flow chart showing the procedure for processing for calculating the maximum saturation which can be taken in the other luminance.

FIG. 19 is a flow chart showing the procedure for processing for calculating the maximum saturation which can be taken in the other luminance.

As in the above-mentioned case, the angle θ is reset to zero (step 101).

When the angle θ is less than 180° (YES at step 102), the maximum saturation is calculated in accordance with the following equation 44 (step 103). When the angle θ is not less than 180° (NO at step 102), the maximum saturation is calculated in accordance with the following equation 45 (step 104).

$$\max\theta 0[\theta] = \max\theta 255(\theta + 180) \quad \text{equation 44}$$

$$\max\theta 0[\theta] = \max\theta(\theta + 180 - 360) \quad \text{equation 45}$$

The angle θ is incremented by one degree (step 105), and the processing at the steps 102 to 104 is repeated until the angle θ reaches 360° (step 106).

It is possible to utilize an equation for calculating the maximum saturation which can be taken in the one luminance to calculate the maximum saturation which can be taken in the other luminance.

Figure 20:
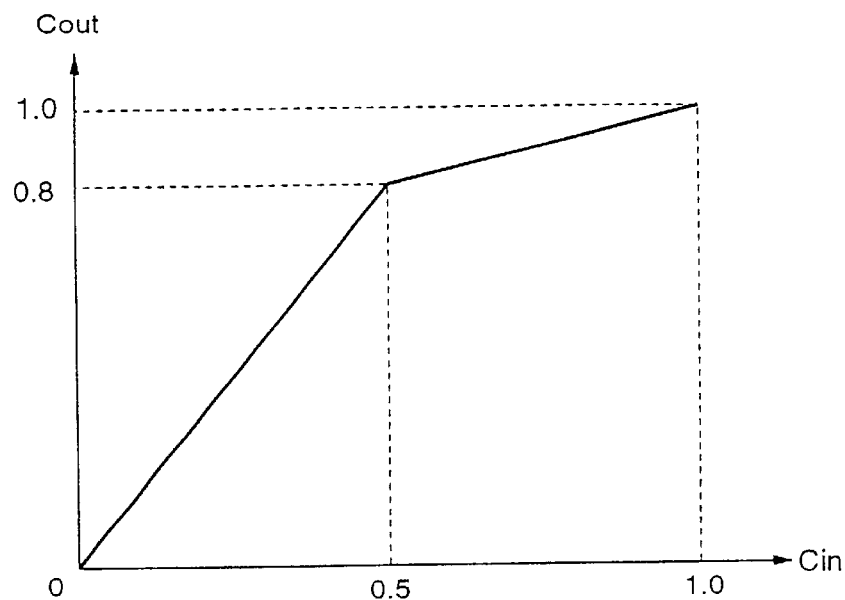
FIG. 20 is a flow chart showing a saturation correction curve.

FIG. 20 illustrates an example of a saturation correction curve.

Although the saturation correction curve shown in FIG. 6 is a circular arc, as described above, the saturation correction curve shown in FIG. 20 is an example of a polygonal line consisting of two straight lines. Saturation correction based of the correction curve is made with respect to all pixels composing an image corresponding to one frame.

The saturation correction curve is determined such that when input is taken as Cin, output is taken as Cout, and the maximum value of the input Cin is taken as 1, correction according to the following equation 46 is made until the input reaches 0.5, while correction according to the following equation 47 is made in a range where the input is between 0.5 and 1.0:

$$Cout = Cin \times 1.6 \quad \text{equation 46}$$

$$Cout = (Cin - 0.5) \times 0.4 + 0.8 \quad \text{equation 47}$$

Figure 21:
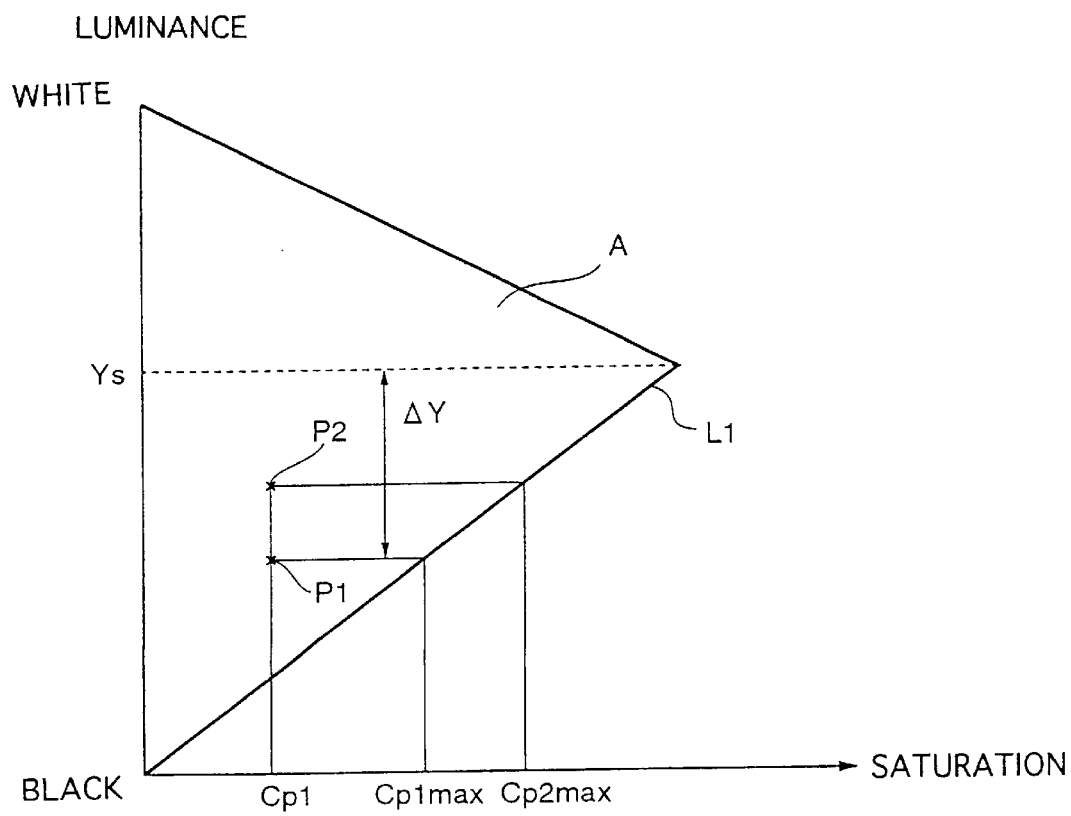
FIG. 21 is a graph showing the relationship between saturation and luminance in a certain hue.

FIG. 21 is a graph showing the relationship between luminance and saturation in a certain hue.

In this graph, the horizontal axis represents saturation, and the vertical axis represents luminance. A region A represents the range of the saturation which can exist in the luminance. A frame L1 of the region A represents the maximum saturation which can be taken in the luminance.

As the luminance increases from the minimum luminance (black), the maximum saturation gradually increases. The maximum saturation is the highest in certain luminance Ys (referred to as optimum luminance).

A given pixel shall be denoted by P1. The saturation of the pixel P1 is Cp1, and the luminance thereof is Y1. The maximum saturation of the pixel P1 is Cp1max. The saturation cannot be improved to not less than the maximum saturation Cp1max.

Consider a pixel P2 having the same saturation Cp1 as that of the pixel P1 and having luminance close to the optimum luminance Ys. The maximum saturation of the pixel P2 is Cp2max higher than the maximum saturation Cp1max of the pixel P1. In the case of the same hue and the same saturation, therefore, it is found that the maximum saturation can be increased by bringing the luminance near optimum luminance.

Figure 22:
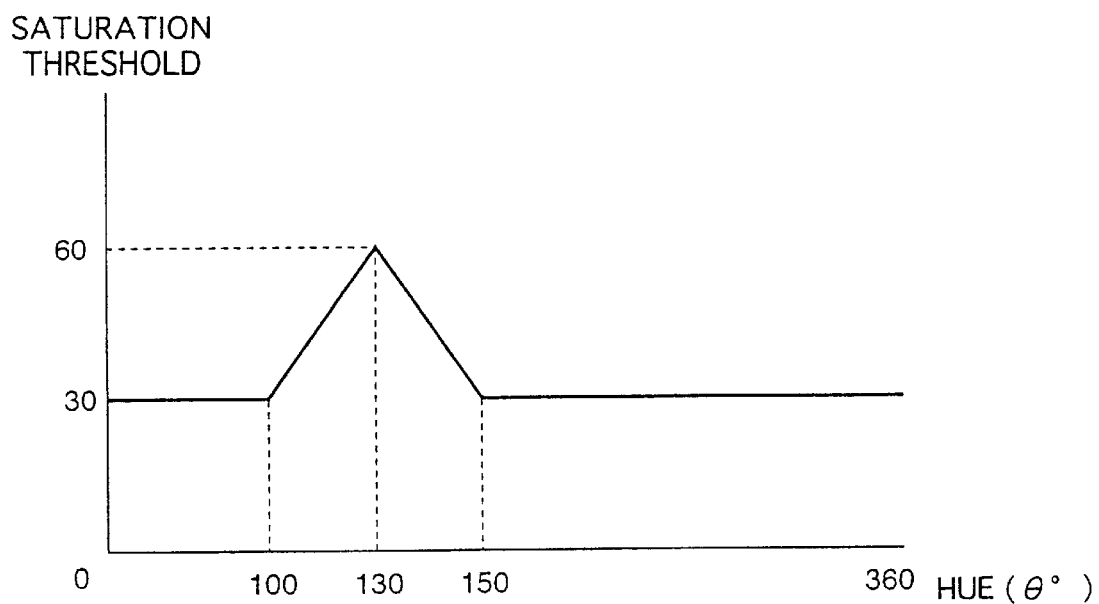
FIG. 22 is a graph showing the relationship between a hue and saturation.
Figure 23:
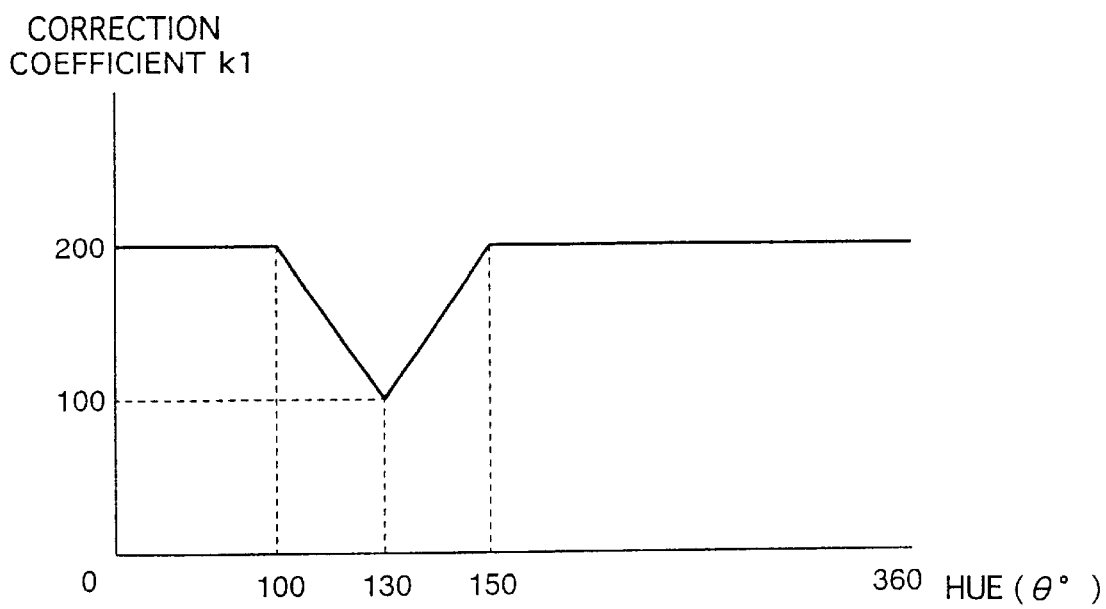
FIG. 23 is a graph showing the relationship between a hue and a correction coefficient.
Figure 24:
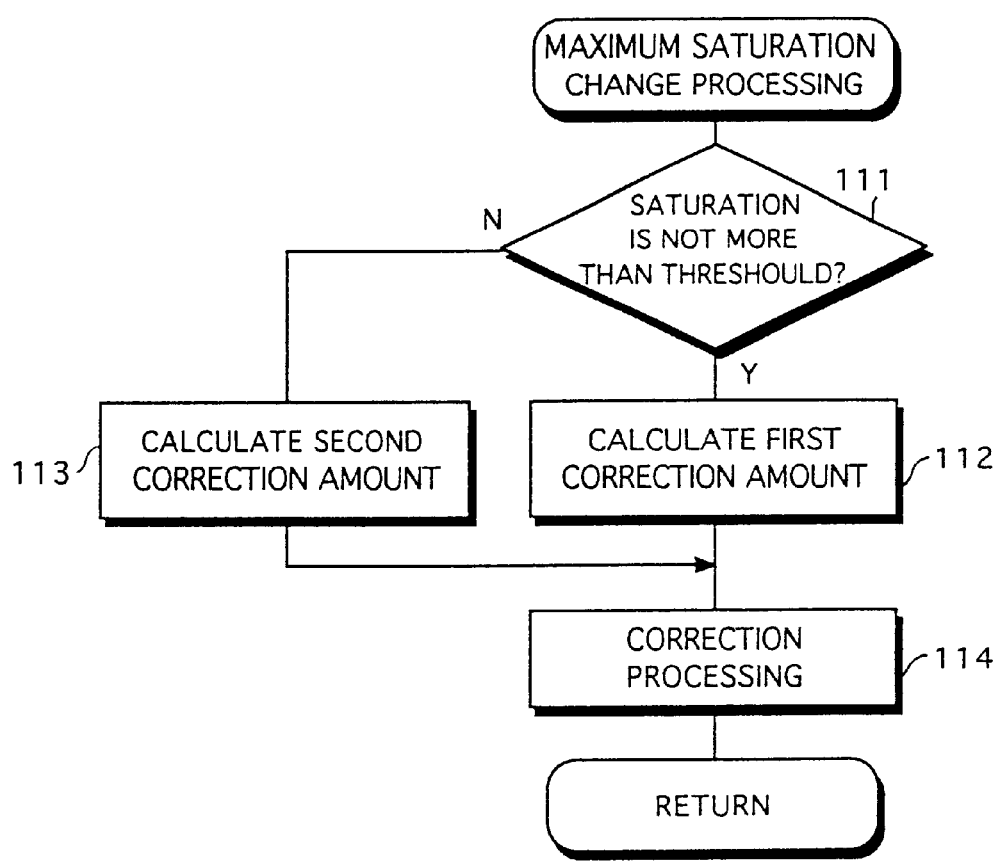
FIG. 24 is a flow chart showing maximum saturation change processing.

FIG. 22 is a graph showing the relationship between a hue and a saturation threshold. FIG. 23 illustrates the relationship between a correction coefficient k1 used for increasing the maximum saturation and a hue. FIG. 24 is a flow chart showing maximum saturation change processing.

It is checked whether or not the saturation of a pixel to be an object is not more than its threshold (step 111). A threshold corresponding to the hue of the pixel to be corrected is determined, as shown in FIG. 22. When the hue of the pixel is not more than 100° nor less than 150°, for example, the saturation threshold is 30. If the hue of the pixel is 130°, the saturation threshold is 60. If the hue of the pixel is between 100° and 130°, the saturation threshold is determined by a line connecting 30 to 60 depending on the hue. If the hue of the pixel is between 130° and 150°, the saturation threshold is determined by a line connecting 60 to 30 depending on the hue.

If the saturation of the pixel is not more than the threshold (YES at step 111), a first correction amount is calculated in the following manner (step 112).

Referring to FIG. 23, the correction coefficient k1 is determined.

The correction coefficient is one whose value varies depending on the hue, as apparent from FIG. 23. If the hue of the pixel to be an object is not more than 100° nor less than 150°, the correction coefficient k1 is taken as 200. If the hue is 130°, the correction coefficient k1 is taken as 100. When the hue is between 100° and 130°, the correction coefficient k1 linearly decreases between 200° and 100° as the hue increases. When the hue is between 130° and 150°, the correction coefficient linearly increases between 100° and 200° as the hue increases.

A difference ΔY between the luminance of the pixel to be changed and the optimum luminance is found. The found difference ΔY is multiplexed by the correction coefficient k1, and is divided by 256. An obtained value is a first correction amount.

The first correction amount thus obtained is added to the luminance of the pixel to be corrected (step 114). The maximum saturation increases.

If the saturation of the pixel is more than the threshold (NO at step 111), a correction coefficient k2 is calculated in accordance with the following equation 48.

$$k2 = (\text{saturation of pixel to be corrected}) \times k1 / (\text{saturation threshold}) \quad \text{equation 48}$$

The above-mentioned difference ΔY is multiplexed by the calculated correction coefficient k2, and is divided by 256, thereby obtaining a second correction amount (step 113). The second correction amount is added to the luminance of the pixel to be corrected (step 114).

When a gray pixel is given, the saturation thereof is zero, so that the correction coefficient is zero. Accordingly, the luminance thereof is not changed. The nearer the color (which may be the color difference) of the pixel is to gray, the smaller the amount of change in the luminance is.

Although in the above-mentioned embodiment, the luminance of the pixel is changed irrespective of the degree of correction, the degree of correction may be limited. For example, the difference ΔY between the luminance of the pixel to be corrected and the optimum luminance is limited to the range of −16 to 16. The luminance of the pixel may not be appreciably changed.

Figure 25:
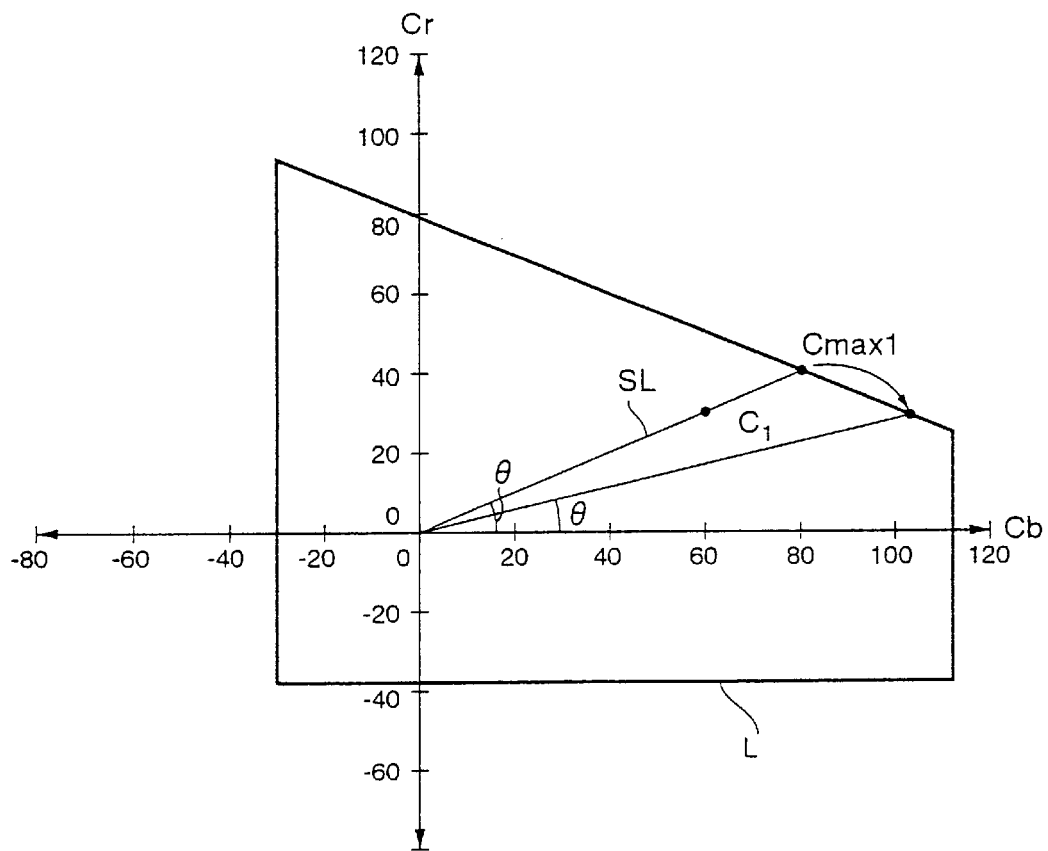
FIG. 25 is a graph showing a color reproduction region in predetermined luminance.
Figure 26:
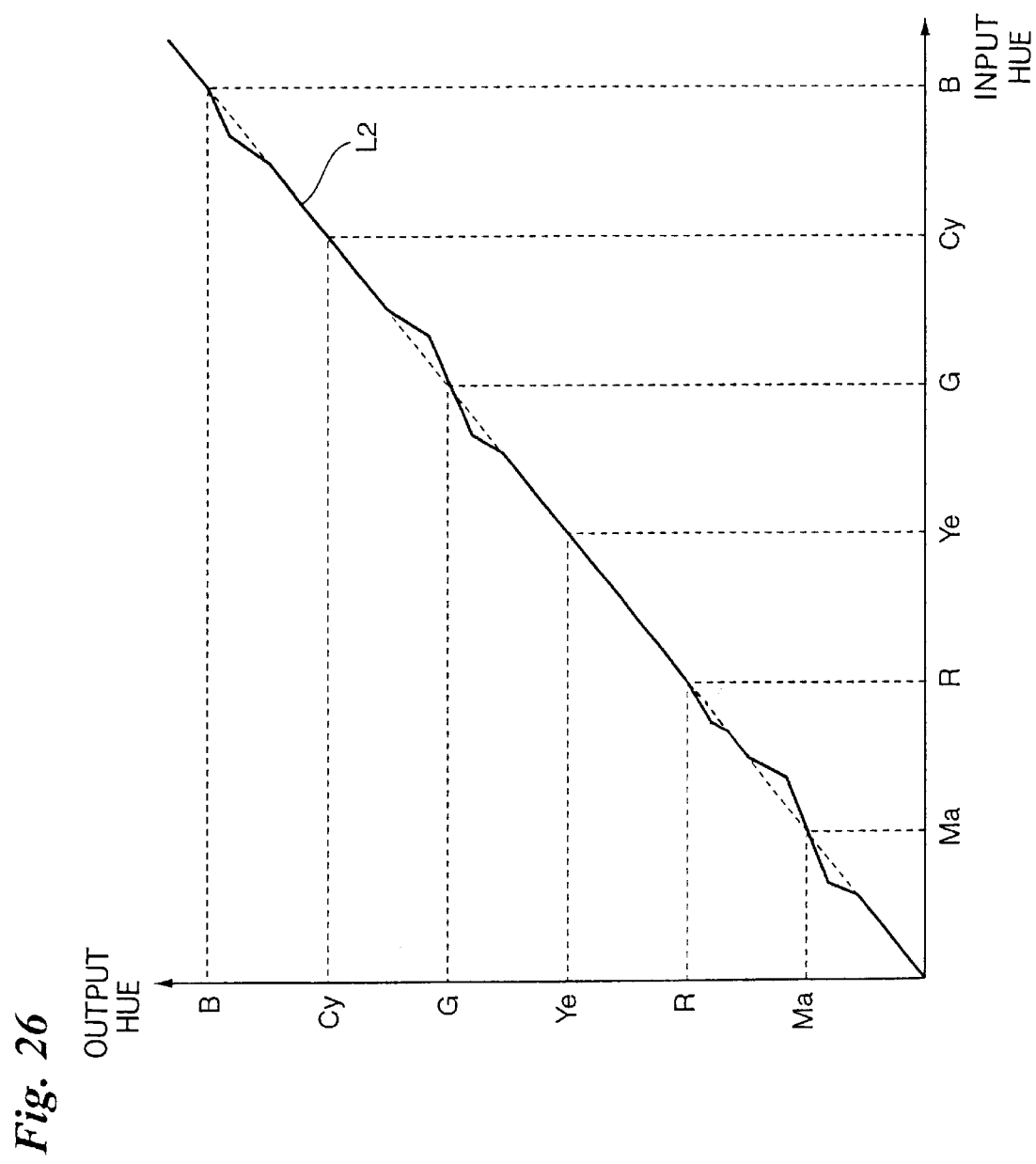
FIG. 26 is a graph showing hue conversion.
Figure 27:
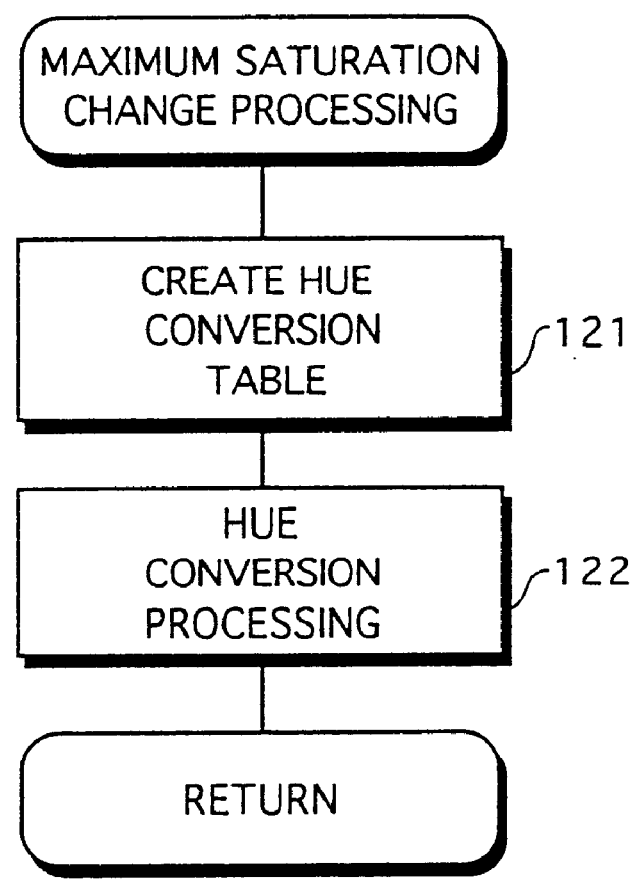
FIG. 27 is a flow chart showing maximum saturation change processing.

FIGS. 25 to 27 illustrate another embodiment.

FIG. 25 corresponds to FIG. 5, described above, which illustrates a Cb-Cr color difference plane in luminance Y=56.

When a certain pixel C1 is paid attention to, the maximum saturation of the pixel C1 is Cmax1, as described above. When the hue θ of the pixel C1 is changed from θ to θ1, the maximum saturation can be further improved irrespective of the same luminance.

FIG. 26 is a graph L2 showing specific hue conversion.

The horizontal axis represents an input hue, and the vertical axis represents an output hue. The hue is converted in accordance with the graph L2, thereby making it possible to further improve the maximum saturation, as described above.

FIG. 27 is a flow chart showing the procedure for processing for maximum saturation conversion processing.

First, a hue conversion table giving the characteristics as shown in FIG. 26 is first created (step 121).

A pixel whose saturation should be improved is converted while keeping the same luminance on the basis of the created hue conversion table (step 122). The maximum saturation is improved. The maximum saturation may be further improved by changing the luminance, as described above.

Figure 28:
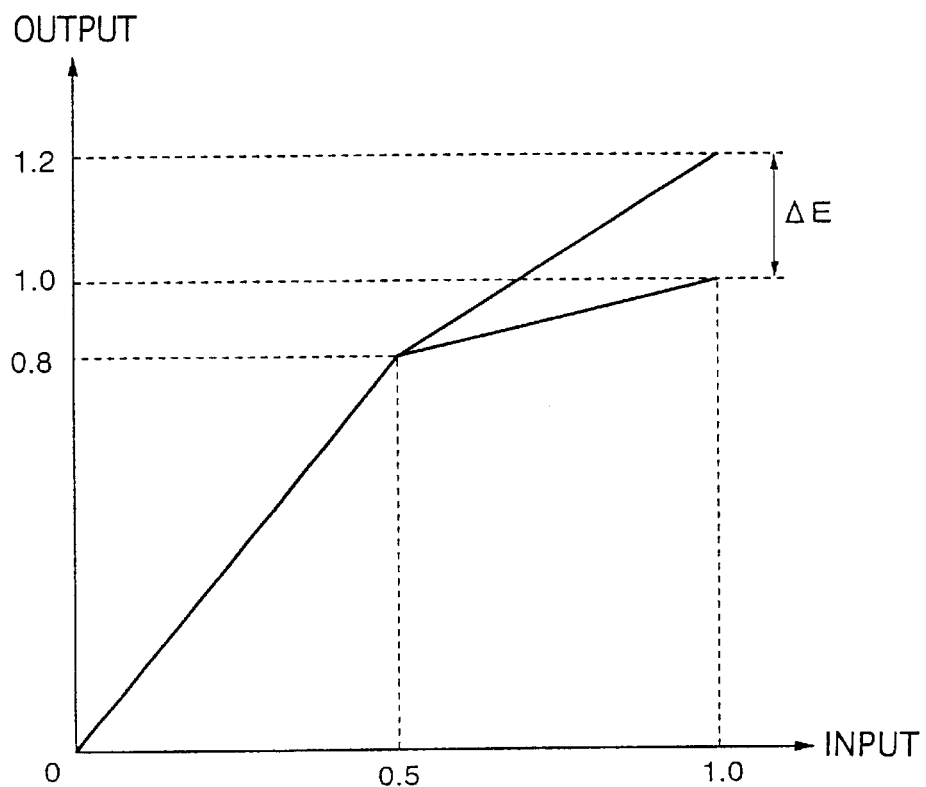
FIG. 28 is a graph showing a saturation correction curve.
Figure 29:
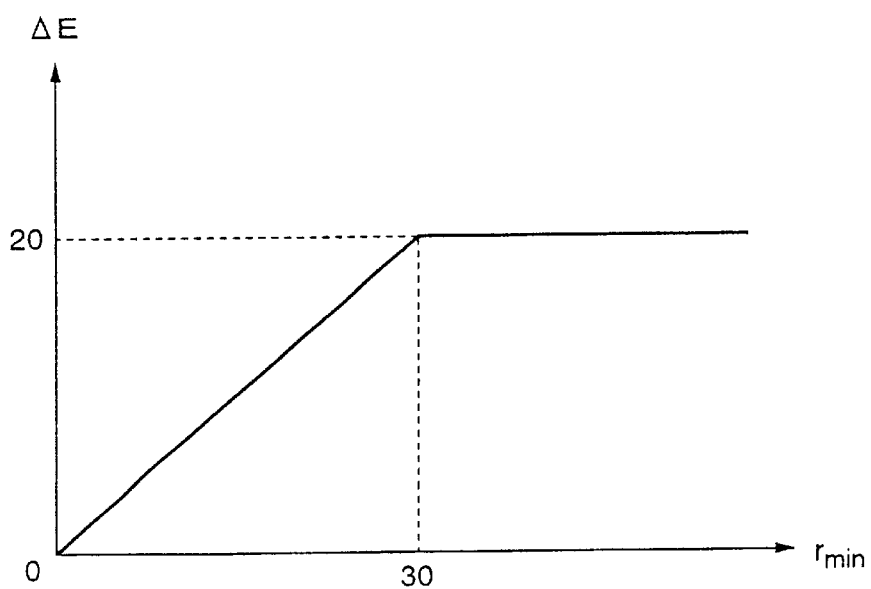
FIG. 29 is a graph for determining parameters for producing a saturation correction curve.
Figure 30:
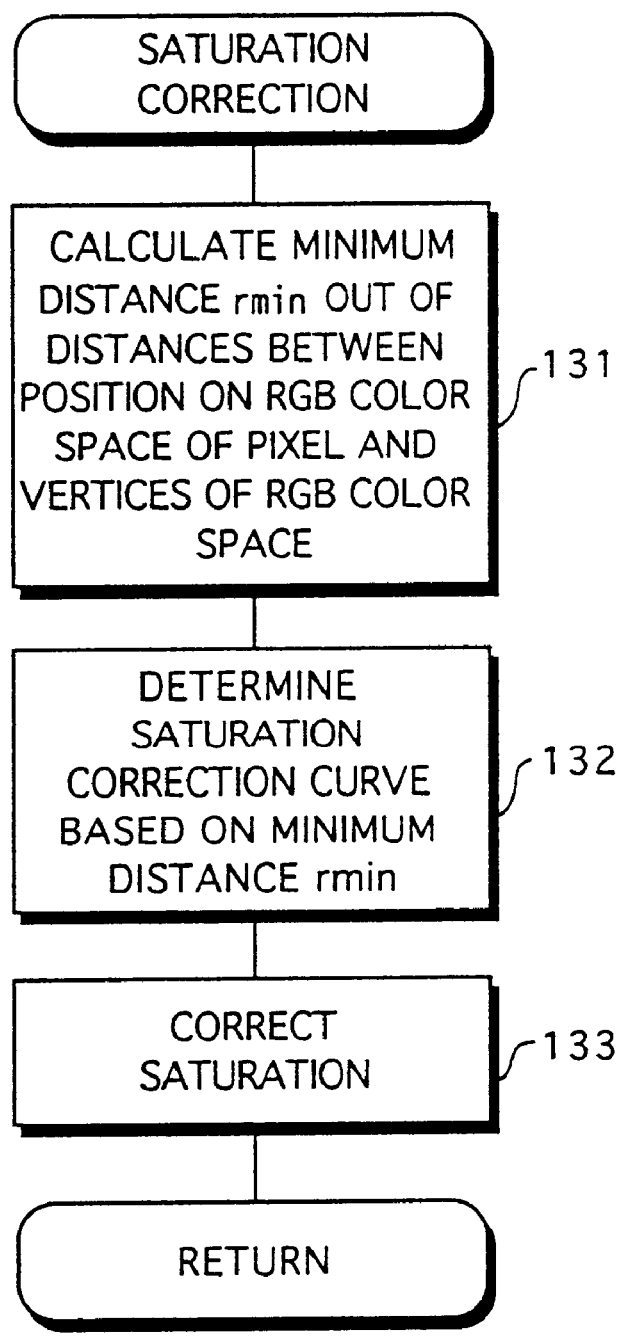
FIG. 30 is a flow chart showing saturation correction processing.

FIGS. 28 to 30 illustrate still another embodiment.

Although in the above-mentioned embodiments, correction is made on the basis of a correction curve determined such that a pixel whose saturation should be corrected is outputted as it is without correcting the saturation in order to prevent color compression from occurring when it has the maximum saturation, the present embodiment is directed to further improving, if it has the maximum saturation, the saturation.

FIG. 28 is a correction curve for saturation conversion.

According to the saturation correction curve, when input is a maximum of 1.0, correction for emphasizing saturation is made in accordance with the foregoing equation 46 until the input is from 0 to 0.5. When the input is 1.0 which is the maximum, the correction for emphasizing saturation is made such that output reaches the value of 1+ΔE. While the input is between 0.5 to 1, the output takes any of values between 0.8 and 1+ΔE as the input increases.

FIG. 29 is a graph for finding ΔE for determining the saturation correction curve.

On an RGB color space, the distances from the position of a pixel whose saturation should be corrected and a vertex satisfying R=255 and G=B=0, a vertex satisfying G=255 and R=B=0, a vertex satisfying B=255 and R=G=0, a vertex satisfying R=G=255 and B=0, and a vertex satisfying R=B=255 and G=0, and a vertex satisfying G=B=255 and R=0 are first calculated (which can be calculated by a simple theorem of three squares, as described above). The smallest one of the calculated distances to the vertices is taken as a distance rmin.

The distance rmin thus found is used to enter the horizontal axis in FIG. 29, and ΔE is used to enter the vertical axis in FIG. 29. If the distance rmin is not more than 30, ΔE linearly increases until it reaches 20. When the distance rmin is not less than 30, ΔE is 20. The smaller the distance rmin is, the smaller ΔE is. Accordingly, it is possible to prevent color compression from occurring by overemphasizing saturation. Further, if the distance rmin is not less than 30, ΔE is limited to 20. Accordingly, the saturation may not be overemphasized. When the saturation is emphasized by not less than 100% when the color is near to the primary colors, color compression occurs. If the color is not near to the primary colors, however, no color compression occurs, although the luminance and the hue are changed.

FIG. 30 is a flow chart showing the procedure for saturation correction processing.

As described above, the distance between the position on an RGB space of a pixel whose saturation should be corrected and each of the vertices on the RGB color space is first calculated, to determine the above-mentioned minimum distance rmin (step 131).

ΔE is determined in accordance with FIG. 28 from the determined minimum distance rmin, so that the saturation correction curve is determined (step 132).

The saturation of the pixel is corrected utilizing the determined saturation correction curve (step 133).

A sharper pixel can be thus obtained.

The above-mentioned processing will be performed in the saturation correcting circuit 18. The correction curve shown in FIGS. 20 or 28 is stored in the saturation correction curve storing circuit 15, as required. Further, a computer will be used, as required, in order to produce a saturation correction curve, for example.

Although description was made of examples in which processing is actually performed for each pixel, it goes without saying that three dimensional LUT (Look-up Table) conversion may be performed after a three-dimensional LUT lattice point is subjected to the above-mentioned processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A saturation correcting apparatus comprising:

saturation data input means for inputting saturation data relating to an image corresponding to one frame which should be corrected; and correction means for performing, with respect to the saturation data relating to the image corresponding to one frame which has been inputted from said saturation data input means, saturation correction processing based on a correction curve for emphasizing and outputting, when the saturation data relating to one of pixels composing the image corresponding to one frame represents intermediate saturation between maximum saturation and minimum saturation which the saturation data relating to the one pixel can take, the saturation data, while outputting, when the saturation data represents said maximum saturation, the saturation data upon stopping the emphasis processing.

2. The saturation correcting apparatus according to claim 1, wherein said correction means outputs, when the saturation data relating to one of the pixels composing the image corresponding to one frame represents said maximum saturation or said minimum saturation, the saturation data as it is.

3. The saturation correcting apparatus according to claim 1, further comprising correction curve production means for producing said correction curve.

4. The saturation correcting apparatus according to claim 1, wherein said correction curve is determined such that the saturation represented by the saturation data after the saturation correction processing is less than said maximum saturation.

5. The saturation correcting apparatus according to claim 1, wherein said correction curve is a circular arc or a polygonal line consisting of a plurality of straight lines.

6. The saturation correcting apparatus according to claim 1, wherein said correction curve is determined on the basis of luminance data and hue angle data which correspond to said saturation data.

7. The saturation correcting apparatus according to claim 1, further comprising calculation means for calculating an average of the saturation data relating to the image corresponding to one frame which has been inputted from said saturation data input means, said correction curve being determined such that the lower the average calculated by said calculation means is, the higher the degree of correction is, while the higher the calculated average is, the lower the degree of correction is.

8. The saturation correcting apparatus according to claim 1, further comprising correction value calculation means for calculating a color difference correction value from the characteristics of color difference data relating to the image corresponding to one frame which should be corrected; and subtraction means for subtracting said color difference correction value from the color difference data relating to the image corresponding to one frame which should be corrected, said correction means performing the saturation correction processing on the basis of said correction curve with respect to the saturation data corresponding to the color difference data from which the color difference correction value has been subtracted by said subtraction means.

9. The saturation correcting apparatus according to claim 1, further comprising range calculation means for respectively finding a first range in which the values of the three primary colors are not more than their maximum values in first luminance of less than the maximum luminance and a second range in which the values of the three primary colors are not less than their minimum values in second luminance of more than the minimum luminance;

first saturation calculation means for finding first maximum saturation defined by the first range of the values of the three primary colors and in the hue of the one pixel whose maximum saturation should be found and second maximum saturation defined by the second range of the values of the three primary colors and in the hue of the one pixel whose maximum saturation should be found;

second saturation calculation means for calculating saturation in the luminance of the one pixel whose maximum saturation should be found, that is, first corresponding saturation corresponding to said first maximum saturation and second corresponding saturation corresponding to said second maximum saturation; and saturation determination means for determining the saturation having the smaller value out of said first corresponding saturation and said second corresponding saturation which have been calculated by said second saturation calculation means to be said maximum saturation.

10. In an apparatus for finding maximum saturation which pixel data representing each of pixels can take, a maximum saturation calculating apparatus comprising:

range calculation means respectively finding a first range in which the values of the three primary colors are not more than their maximum values in first luminance of less than maximum luminance and a second range in which the values of the three primary colors are not less than their minimum values in second luminance of more than minimum luminance;

first saturation calculation means for finding first maximum saturation defined by the first range of the values of the three primary colors and in the hue of the one pixel whose maximum saturation should be found and second maximum saturation defined by the second range of the values of the three primary colors and in the hue of the one pixel whose maximum saturation should be found;

second saturation calculation means for calculating saturation in the luminance of the one pixel whose maximum saturation should be found, that is, first corresponding saturation corresponding to said first maximum saturation and second corresponding saturation corresponding to said second maximum saturation; and determination means for determining the saturation having the smaller value out of said first corresponding saturation and said second corresponding saturation which have been found by said second saturation calculation means to be the maximum saturation taken by said pixel data.

11. The maximum saturation calculating apparatus according to claim 10, wherein said first luminance and said second luminance are determined such that luminance obtained by the weighted mean of said first luminance and said second luminance is intermediate luminance between the minimum luminance and the maximum luminance, and said range calculation means finds one of the first range of the values of the three primary colors and the second range of the values of the three primary colors on the basis of the other range.

12. A pixel data correcting apparatus comprising:

luminance calculation means for calculating luminance in which maximum saturation is given in the hue of a pixel to be corrected whose saturation should be corrected; and luminance correction means for correcting, when there is a difference between the luminance calculated by said luminance calculation means and the luminance of said pixel to be corrected, the luminance of said pixel to be corrected such that the difference is decreased.

13. The pixel data correcting apparatus according to claim 12 further comprising saturation correction means for correcting the saturation of the pixel to be corrected whose luminance has been corrected such that the saturation is increased.

14. The pixel data correcting apparatus according to claim 12, further comprising determination means for determining the amount of correction of the luminance by said luminance correction means on the basis of at least one of the hue and the saturation of said pixel to be corrected.

15. A pixel data correcting apparatus comprising:

judgment means for judging whether or not maximum saturation in the hue of a pixel to be corrected whose saturation should be corrected can be further increased by changing the hue; and hue change means for changing the hue of said pixel to be corrected such that the maximum saturation is increased in response to the judgment by said judgment means that said maximum saturation can be further increased by changing the hue.

16. A pixel data correcting apparatus comprising:

input means for inputting data representing the hue of a pixel to be corrected whose saturation should be corrected; and hue change means for bringing the hue represented by the hue data inputted from said input means near the hue at the shorter distance from the hue of the pixel out of the hues of the primary colors with the hue of the pixel interposed therebetween.

17. A saturation correcting apparatus for correcting the saturation of each of pixels on the basis of a correction curve having correction characteristics for emphasizing and outputting inputted saturation, comprising:

calculation means for calculating the shortest one of the distances on a color space between the color of the pixel whose saturation should be corrected and the three primary colors; and means for determining said correction curve such that the maximum saturation which can be inputted is further emphasized and outputted, and the larger said distance calculated by said calculation means is, the higher the degree of the emphasis is, while the smaller said distance is, the lower the degree of the emphasis is.

18. A saturation correcting method comprising the steps of:

inputting saturation data relating to an image corresponding to one frame which should be corrected; and performing, with respect to the inputted saturation data relating to the image corresponding to one frame, saturation correction processing based on a correction curve for emphasizing and outputting, when the saturation data relating to one of pixels composing the image corresponding to one frame represents intermediate saturation between maximum saturation and minimum saturation which the saturation data relating to one pixel can take, the saturation data, while outputting, when the saturation data represents said maximum saturation, the saturation data upon stopping the emphasis processing.

19. In an apparatus for finding maximum saturation which pixel data representing each of pixels can take, a maximum saturation calculating method comprising the steps of:

respectively finding a first range in which the values of the three primary colors are not more than their maximum values in first luminance of less than maximum luminance and a second range in which the values of the three primary colors are not less than their minimum values in second luminance of more than minimum luminance;

finding first maximum saturation defined by said first range of the values of the three primary colors and in the hue of the one pixel whose maximum saturation should be found and second maximum saturation defined by said second range of the values of the three primary colors and in the hue of the one pixel whose maximum saturation should be found;

calculating saturation in the luminance of the one pixel whose maximum saturation should be found, that is, first corresponding saturation corresponding to said first maximum saturation and second corresponding saturation corresponding to said second maximum saturation; and determining the saturation having the smaller value out of the said found first corresponding saturation and second corresponding saturation to be the maximum saturation taken by said pixel data.

20. A pixel data correcting method, comprising the steps of:

calculating luminance in which maximum saturation is given in the hue of a pixel to be corrected whose saturation should be corrected; and correcting, when there is a difference between the calculated luminance and the luminance of said pixel to be corrected, the luminance of said pixel to be corrected such that the difference is decreased.

21. A pixel data changing method, comprising the steps of:

judging whether or not maximum saturation in the hue of a pixel to be corrected whose saturation should be corrected can be further increased by changing the hue; and changing the hue of said pixel to be corrected such that the maximum saturation is increased in response to the judgment that the maximum saturation can be further increased by changing the hue.

22. A pixel data correcting method, comprising the step of:

bringing the hue of a pixel to be corrected whose saturation should be corrected near the hue at the shorter distance from the hue of the pixel out of the hues of the primary colors with the hue of the pixel interposed therebetween.

23. In an apparatus for correcting the saturation of each of pixels on the basis of a correction curve having correction characteristics for emphasizing and outputting inputted saturation, a saturation correction curve determining method comprising the steps of:

calculating the shorter one of the distances on a color space between the color of the pixel whose saturation should be corrected and the three primary colors; and determining said correction curve such that the maximum saturation which can be inputted is further emphasized and outputted, and the larger said calculated distance is, the higher the degree of the emphasis is, while the smaller said distance is, the lower the degree of the emphasis is.

* * * * *